United States Patent
Blieninger

(10) Patent No.: US 9,440,391 B2
(45) Date of Patent: Sep. 13, 2016

(54) PELLET PRESS WITH A CUTTING-TO-LENGTH DEVICE FOR BIOGENIC FIBROUS PELLETS

(71) Applicant: Franz Blieninger, Landshut (DE)

(72) Inventor: Franz Blieninger, Landshut (DE)

(*) Notice: Subject to any disclaimer, the term of this patent is extended or adjusted under 35 U.S.C. 154(b) by 142 days.

(21) Appl. No.: 14/073,073

(22) Filed: Nov. 6, 2013

(65) Prior Publication Data

US 2014/0127341 A1 May 8, 2014

(30) Foreign Application Priority Data

Nov. 6, 2012 (DE) .......................... 10 2012 110 622

(51) Int. Cl.
*B29C 47/00* (2006.01)
*B30B 11/20* (2006.01)
*B30B 11/22* (2006.01)

(52) U.S. Cl.
CPC ......... *B29C 47/0066* (2013.01); *B30B 11/201* (2013.01); *B30B 11/227* (2013.01); *B30B 11/20* (2013.01); *B30B 11/204* (2013.01); *B30B 11/22* (2013.01); *B30B 11/221* (2013.01)

(58) Field of Classification Search
CPC ... B30B 11/20; B30B 11/201; B30B 11/204; B30B 11/22; B30B 11/221; B30B 11/227; B29C 47/0066
USPC ................ 425/292, 301, 306, 307, 308, 314
See application file for complete search history.

(56) References Cited

U.S. PATENT DOCUMENTS

| 2,144,054 | A | * | 1/1939 | Hall | ..................... B30B 11/201 425/331 |
| 2,240,660 | A | * | 5/1941 | Meakin | ................. B30B 11/201 100/907 |
| 2,252,900 | A | | 8/1941 | Shafer | |
| 2,603,170 | A | * | 7/1952 | Meakin | ................. B30B 11/201 425/314 |
| 2,700,941 | A | * | 2/1955 | Johnson | ................ B30B 11/201 34/182 |

(Continued)

FOREIGN PATENT DOCUMENTS

DE      299 19 030 U1   2/2000
EP      2 418 074 A2    2/2012

(Continued)

OTHER PUBLICATIONS

German Patent Office Search Report, Jul. 2, 2013.

*Primary Examiner* — Seyed Masoud Malekzadeh
(74) *Attorney, Agent, or Firm* — Dority & Manning, P.A.

(57) ABSTRACT

A cutting-to-length device for a pellet press has at least one cutting-to-length means for biogenic fibrous pellets, especially wood pellets, and a fastening area, in which the cutting-to-length device can be fastened to a stationary housing part of the pellet press. The cutting-to-length means can be arranged in the radially outer area of a rotation annular die of the pellet press and at a distance from the annular die which has radial through-holes. The cutting-to-length mechanism has a concave arched contour and is attached on the radially outer area of the annular die by means of the fastening area so that the cutting-to-length mechanism extends largely helically with its curvilinear contour over the area of the radial through-holes of the annular die. Furthermore, the invention refers to a pellet press with at least one such cutting-to-length device.

15 Claims, 12 Drawing Sheets

(56) References Cited

U.S. PATENT DOCUMENTS

| | | | | |
|---|---|---|---|---|
| 2,764,951 A | * | 10/1956 | Fisher | B30B 11/201 100/907 |
| 2,845,036 A | * | 7/1958 | Fisher | B30B 11/201 425/154 |
| 2,887,718 A | * | 5/1959 | Curran | B30B 11/201 264/13 |
| 3,017,845 A | * | 1/1962 | Bonnafoux | B30B 11/201 100/210 |
| 3,117,343 A | * | 1/1964 | Soars, Jr. | B30B 11/208 425/331 |
| 3,183,859 A | * | 5/1965 | Peterson | B30B 11/202 100/909 |
| 3,841,817 A | * | 10/1974 | Moldenhauer | B30B 11/208 425/190 |
| 4,000,232 A | * | 12/1976 | Klaeysen | B29B 9/00 264/117 |
| 6,299,430 B1 | | 10/2001 | Wallace | |
| 2012/0313277 A1 | | 12/2012 | Signer et al. | |

FOREIGN PATENT DOCUMENTS

| | | |
|---|---|---|
| WO | WO 2008/058956 A2 | 5/2008 |
| WO | WO 2008/063347 A2 | 5/2008 |

* cited by examiner

PELLET PRESS WITH A CUTTING-TO-LENGTH DEVICE FOR BIOGENIC FIBROUS PELLETS

FIELD OF THE INVENTION

This invention relates to two alternative cutting-to-length devices for a pellet press with at least one cutting-to-length means for biogenic fibrous pellets, especially wooden pellets, and at least one fastening area in which the cutting-to-length device can be fastened in such a way to the fixed housing part of the pellet press that the cutting-to-length means can be arranged at a distance from one another in the radially external area of a pivoted annular die of the pellet press that has radial through-holes. Furthermore, the invention relates to a pellet press for pressing biogenic fibrous pellets, especially wood pellets, with a pivoted annular die that has essentially radial through-holes and creates a pressing space in its interior into which biogenic fibrous press material can be fed, with at least one Koller roller eccentrically arranged with regard to the annular die, capable of rolling off on its internal perimeter in such a way that the press material is pressed through the through-holes for creating the pellets, and with at least one cutting-to-length device having one cutting-to-length means fastened in such a way to a fixed housing part of the pellet press that the cutting-to-length means is arranged in the radially external area of the pivoted annular die at a distance from it.

BACKGROUND

Large quantities of saw by-products accumulate in the wood-working industry. Among them are, above all, sawdust, wood shavings and wood chips, from which ordinarily wood pellets are made. One such rod-like wood pellet has, for example, a diameter ranging from 4 mm to 10 mm, a length between 5 mm and 45 mm, a bulk density from about 1.1 to 1.3 kg/dm$^3$, and an approximate energy density of 5 kWh/kg. Pellet manufacturing is done in a known annular, circular or flat die press, in which Koller rollers press the material to be pressed through the bore holes or pressing channels of the die. This process is characterized by temperatures exceeding 120° C. and very high pressures, and they are highest in the wall areas of the pressing channels. Consequently, the cylindrical surface of the pellets is very smooth and has a very high density.

On the inflow side, the press channels have a conical inflow chamfer only a few millimeters deep. Looking closer at an individual press channel, one can see that the compacting of the fibrous and fine chip material takes place cyclically every time a Koller roller rotates past. The funnel-shaped fibrous structure in the pellets is created by the funnel-shaped chamfer. For this reason, pellets have a convex surface in the front and a concave surface in the back. A pellet die for 6-mm thick pellets has, with a press channel bore hole of 6 mm diameter, for example, a press channel length of about 40 mm and widens radially to the exterior in steps after 20 millimeters to 6.4 mm, 6.8 mm and 7.2 mm. The background for this is explained by the fact that the pressed strand of fibrous material should be guided even further after the actual press channel section with the 6-mm diameter and the die needs to have certain strength of material for reasons of resistance of materials. The front surface of the pellets has a highly irregular, rough and brittle surface. As a result of this, the front sides of the pellets are mainly responsible for the creation of troublesome fine particles and dust every time the pellets are manipulated.

Typically, pellets are injected by means of silo tankers in the storage bunker. It has been shown that the long pellets "fly" through the hose pipes at an angle of about 45° against the direction of the airflow in the middle of the blow pipe cross section almost without touching. Long pellets have better "aerodynamic properties" than short pellets. For this reason, during the injection process, the short pellets are found primarily on the bottom of the injection hoses together with the broken pieces, where they are largely transported in a rolling way. In this case, they make contact with the underside of the hose and collide with the house couplings, thereby producing more fine particles. Short pellets, pellet fragments and dust flow a lot worse than uniformly long pellets.

The front sides have a significantly higher friction in pellet bulks than the smooth cylindrical surfaces. The percentage share of front sides drops linearly with the growing average length of the pellets. The ideal length of pellets is about 25-35 mm for small pellet fuels. The maximum length of wood pellets has been fixed by the 7.5×D (diameter) formula established by the European Standard EN 14961-2. For the commercially available, small-fuel pellets having a diameter of 6 mm this translates into a maximum length of 45 mm.

In this regard, the cutting techniques usually employed in the market have some drawbacks. In circular dies, fixed transverse bars made of flat steel are arranged in the radially outer area at a distance. Initially, the pellet grows out of the fast-rotating annular die as it passes through the press channel. As soon as a pellet is long enough, it hits against one of the transverse bars while it circulates, in which case it is broken up by the annular die. The transverse bars made of flat steel are twisted 90° with respect to the circulation direction of the annular die. Consequently, the pellets are suddenly slowed down when they hit the transverse bar perpendicularly. The pellets are still very hot (just under 100° C.), mechanically unstable, and still soft. The path velocity of an annular die is about 7.5 m/sec. When they are being knocked off, the pellets are therefore accelerated strongly and set rotating by the standing transverse bar arranged at a 90° angle with respect to the rotational direction. Afterwards, they still hit more transverse bars or other structural parts of the pellet press at high speed. When the pellets are severed from the annular die and/or when they subsequently strike the other parts of the pellet press, they break up uncontrollably in pieces of varying length. A lot of dust created by the fragments is formed in the process. In an annular die having a hole diameter of 6 mm, the fine particles generated in accordance with the known cutting technique amount to about 5%-8%.

SUMMARY OF THE INVENTION

A task of this invention is therefore to create a cutting-to-length device and a pellet press with a corresponding cutting-to-length device by means of which pellets of uniform length can be produced as much as possible with little simultaneous generation of fine fragmentary dust. Additional objects and advantages of the invention will be set forth in part in the following description, or may be obvious from the description, or may be learned through practice of the invention.

The first cutting-to-length device according to the invention for a pellet press has at least one cutting-to-length mechanism for biogenic fibrous pellets, especially wood pellets. Furthermore, the cutting-to-length device has at least one fastening area in which the cutting-to-length device can be fastened to a fixed housing part of the pellet press in such a way that the cutting-to-length mechanism in the radially external area of a pivoted annular die of the pellet press having radial through-holes and can be arranged at a distance from it. The cutting-to-length mechanism has a concave arched contour, especially an internal contour. The concave arched contour is preferably squeezed together or stretched with regard to a curvilinear contour. Alternatively, it can also be designed as an arc-shaped contour. The cutting-to-length mechanism can be attached to the fastening area in such a way in the radially outer area of the annular die that the cutting-to-length mechanism with its arched contour extends largely helically over at least one area of one of the radial through-holes of the annular die intended for this purpose. The dimensions of this area—over which the cutting-to-length mechanism extends at least over one of the radial through-holes of the annular matrix—is preferably larger in the radial direction of the annular or equal to the diameter of the through-hole (D) and in circumferential direction of the annular die larger than or equal to $D/\tan \alpha$, in which case $\alpha$ is the angle of climb of the cutting-to-length mechanism that is extending in a helix-shape. Consequently, the cutting-to-length mechanism has at least one length L larger than or equal to $D/\sin \alpha$.

Through this design and arrangement of the cutting-to-length mechanism with respect to the annular die intended for this purpose, comes a pellet, which protrudes through the through-hole over the annular die in its radial direction with a larger length than the separation between annular die and cutting-to-length mechanism, in the area of its free end, especially with its lateral surface, and comes to rest on the cutting-to-length mechanism. Furthermore, the pellet is able to move at first along it in the circumferential direction in such a way that the pellet is deflected from the cutting-to-length mechanism with an axial component having a force, mostly in the axial direction of the annular die, so that it is snapped off in the area of the annular die. Thus, the pellet is not abruptly slowed down, but led in circumferential direction along the path of a defined angular area of the annular die, especially prone to be influenced by the angle of climb of the helix-shaped cutting-to-length mechanism and, in the process, at the same time increasingly deflected from its radial initial position until the pellet is gently snapped off or severed by the annular die. As a result of this, an undefined breaking or cutting of the pellet into pieces of various sizes is prevented. Consequently, the pellets advantageously have an essentially constant length or one that varies within a spectrum owing to the separation between the outer perimeter of the annular die and the inner contour of the cutting-to-length mechanism. As a result of this, the share of undesired "short pellets" under 14 mm can be reduced from a current average of 60% to less than 10%. In addition, the share of fine dust generated during the separation can be reduced by up to 80%, and this can lower production costs and increase throughput.

Furthermore, the severed pellets are guided in the axial direction of the annular die with the cutting-to-length mechanism extending helically in the axial direction. By this means, it is prevented that the severed pellets are hurled in an undefined way towards pellet press areas not intended for the purpose, being possibly damaged or also broken up into at least two shorter undefined large pellet pieces. Thus, the cutting-to-length mechanism is shaped in such a way that the pellets are gently snapped off and led to an ejection area of the pellet press in axial direction.

According to an embodiment of the invention, the first cutting-to-length device has a basic body with a concave, especially curvilinear, radial guide surface in whose area the cutting-to-length mechanism has been arranged. Preferably, the first cutting-to-length mechanism is arranged on an inner surface of the radial guide surface facing the annular die. The cutting-to-length device is preferably arranged in such a way with respect to the annular die intended for this purpose that the annular die and the curvilinear radial guide surface are arranged concentrically towards and/or from one another, spaced apart especially by a first annular gap. Both for pellets already severed from the annular die and for pellets broken in the area of the annular die's through-hole, the curvilinear radial guide surface acts as a radial guiding mechanism. As a result of this, severed pellets and/or pellets broken particularly by vibrations in the through-hole area do not fly radially and uncontrollably towards the exterior, where they collide against sharp-edged surfaces of the pellet press and could break into undefined, long fragments. Instead, these pellets are guided in the radial direction of the annular die through the curvilinear radial guide surface in a defined separation from the outer perimeter of the annular die and/or selectively in a collecting area of the pellet press. Furthermore, the radial guide surface guides the pellets broken in the through-hole area to the cutting-to-length mechanism, especially through vibrations. The cutting-to-length mechanism is separated from the annular die by a second annular gap. The radial width of the second annular gap is larger than the radial width of the first annular gap. As soon as the pellets led from the radial guide surface to the cutting-to-length mechanism make contact with the cutting-to-length mechanism, they are gently snapped off by it. The radial width of the first annular gap therefore defines the maximum length of the pellets.

It is advantageous for the radial guide surface to be tilted at least in one area—particularly in an area of at least one of the ends pointing towards the circumferential direction, at least towards one of its two front sides pointing in the axial direction. By means of this incline of the radial guide surface running in an axial direction, the severed pellets can be quickly led away from the separation area of the cutting-to-length device. Preferably, the radial guide surface has been executed largely in the shape of a gable in cross section, especially in the axial direction. As a result of this, the pellets can be led away from the direction of its two axial front sides.

It is advantageous if the separation in the radial direction of the annular die between the cutting-to-length mechanism and the annular die is essentially constant, preferably in the area of at least one of the radial through-holes or at least over the length L of the cutting-to-length mechanism that is necessary for snapping off a pellet. As a result of this, it can be ensured that the pellet to be snapped off comes to rest immediately after it has reached the area of the cutting-to-length mechanism, especially along one side of the cutting-to-length mechanism and/or particularly on the front side of the radial guide surface. Preferably, the pellet is guided from the cutting-to-length mechanism through its entire deviating length L, especially along a contact surface of the cutting-to-length mechanism.

If the cutting-to-length mechanism is executed to be long so it extends over the area of at least two radial through-holes or two bore rings—designed by the through-holes arranged in the circumferential direction behind one another—, it is advantageous if the separation between the cutting-to-length mechanism and annular die remains constant over the entire length. Thus, the pellets that were sheared off in the area of the first through-hole or the first bore ring have the same length as the pellets that were sheared off in the area of the second through-hole or the second bore ring.

Alternatively or additionally, the largely arched contour of the cutting-to-length mechanism can also be designed in such a way, however, that the separation between cutting-to-length mechanism and annular die is variably executed, so that the separation between the cutting-to-length mechanism and annular die is larger or smaller in the area of a first bore ring than the separation between these two in the area of a second bore ring. Preferably, the cutting-to-length mechanism is stepped in the area of the arched contour and/or designed in a falling or rising way, especially linearly or wavy, from one end of the cutting-to-length mechanism to its other end. Advantageously, not all the pellets are therefore severed from the annular die when they have the same length, but within a length spectrum that can be influenced by the design of the arched contour. Thus, in the area of the first bore ring, the pellets severed from the cutting-to-length mechanism have a different length with respect to one another compared to those pellets severed in the area of the second bore ring. The length range or length spectrum, in which the separation of the cutting-to-length mechanism varies with regard to the annular die, determines the Gauss length distribution curve of the pellets. Particularly long pellets with a preferably low fluctuation width (steep and narrow Gauss curve) are preferably used for pellet gasification in combined heat and power plants. Medium-long pellets with a somewhat wider distribution increase volume weight and are often used in small-scale furnaces, where energy density plays an important role.

It is advantageous for the helical cutting-to-length mechanism to have an angle of climb of less than ±90°, preferably less than ±60°, very preferably of less than ±45°. Thus, the cutting-to-length mechanism is arranged in a slanted way with regard to the axial axis of the annular die. Consequently, the pellets that have not been severed yet can move along the cutting-to-length mechanism in the circumferential direction at least over a small angular area, so they are not abruptly slowed down by the cutting-to-length mechanism. An undefined breaking of the pellets can thus be prevented. The pellets are therefore advantageously severed or snapped off by the annular die with an essentially constant length or within a length spectrum.

The pellets are especially gently snapped off when the angle of climb of the helical cutting-to-length mechanism has been selected to be very small, especially within a range from 1° to 15°, very preferably within a range from 5° to 10°.

Depending on the setting of the angle of climb and the rotational direction of the annular die, it is possible to influence the guiding direction of the severed pellets in the axial direction. Preferably, the setting of the angle of climb has been chose in such a way with regard to the rotational direction of the annular die, that the severed pellets are guided towards one of the two axial directions of the annular die, especially towards a fixed housing part of the pellet press designed as a lid. As a result of this, it can be prevented that the severed pellets fly around randomly in the pellet press and strike the edges of the pellet press, thereby possibly breaking at least into two long, undefined parts.

To compensate for manufacturing tolerances and so the angle of climb for biogenic fibrous press materials of different length can be set, it is advantageous if the angle of climb of the cutting-to-length mechanism has been designed so that it can be adjusted. Thus, the latter can be adjusted in such a way within the framework of an iterative optimization process that an optimal length of the pellets can be ensured, preferably being essentially constant.

It is advantageous if the cutting-to-length mechanism has at least two adjoining areas with different angles of climb. As a result of this, the separation process of the pellets from the annular die can be set up optimally so the pellets are always severed with a largely constant length or within a defined length spectrum, without them or the remaining part of the pellets in the through-holes of the annular die being additionally broken. Preferably, the pellet protruding above the annular die in the axial direction is initially slightly deflected by and large in a first area with a smaller angle of climb and then fully snapped off in a subsequent second area executed with a larger angle of climb.

In an advantageous further development of the invention, the helical cutting-to-length mechanism has an edge surface and/or contact surface for axially guiding and/or deflecting the pellet. By means of the edge surface, the touching surface and ensuing friction between the cutting-to-length mechanism and the pellet can be reduced. As a result of this, the breaking up of the pellet into two long and undefined parts caused by friction forces in the area of the cutting-to-length mechanism can be prevented. If the cutting-to-length mechanism has a contact surface, the pellet can be guided very well as it is led along the cutting-to-length mechanism, but also it is already in the severed state. Preferably, after the separation, the pellet is guided with the help of the contact surface in the axial direction of the annular die, to the area of the pellet press ejection opening. Preferably, the edge surface and/or contact surface are arranged at an angle in such a way with respect to the radial guide surface, that the pellet comes to rest with its front side on the radial guide surface and the edge surface and/or contact surface on its cylindrical front surface. Consequently, the radial guide surface is preferably oriented in the radial direction of the annular die and the contact surface in the axial and circumferential direction of the annular die.

It is advantageous for the cutting-to-length mechanism to be largely helical or to extend at least over an area of the curvilinear radial guide surface, especially in circumferential direction over its entire length. This allows the pellets, immediately after being snapped off in the radially outer area of the annular—or if they have already been broken in the through-hole of the annular die before the defined snapping off—to be led from the curvilinear radial guide surface immediately adjoining the cutting-to-length mechanism toward the radial direction of the annular die. As a result of this, it is prevented that the severed pellets are thrown around uncontrollably in the interior of the pellet press.

The edge surface, contact surface and/or radial guide surface is/are executed smoothly for reducing friction between the cutting-to-length device and the pellet. Additionally or alternatively, it is advantageous if the edge surface, contact surface and/or radial guide surface have at least one lubricating opening for a lubricant, especially a natural vegetable oil. It can thus be ensured that the pellets protruding radially from the annular die would not be abruptly slowed down by friction forces and thereby be snapped off or broken up uncontrollably in different lengths. Instead, they can be guided by the edge surface, contact surface and/or radial guide surface so they slide along with as little friction as possible.

It is advantageous if the cutting-to-length mechanism is executed as a shoulder, rib or groove, especially in the radial guide surface. A cutting-to-length mechanism executed as a shoulder has the advantage of having a very sturdy design, thereby giving it a very high service life. If the cutting-tolength mechanism is executed as a rib, it can be advantageously arranged also in the area of a Koller roller of the pellet press, as thus the radially inner area of the cutting-to-length mechanism can have a very small surface and as a result of this only a negligible percentage of the pellets protruding radially with the front side of their free end abut against the radially inner terminal area of the cutting-to-length mechanism or rib in the area of the Koller rollers. Furthermore, in a cutting-to-length mechanism executed as a rib, the angle of climb of the rib and/or the rib can be easily adjusted with respect to the radial guide surface. If the cutting-to-length mechanism is executed as a groove, the pellets can be selectively cut to length because they have already been broken in the area of the annular die's through-hole and owing to their centrifugal force they are pressed outwards towards the groove.

It is advantageous if the cutting-to-length device has at least a second cutting-to-length mechanism arranged at a distance from or right next to the first cutting-to-length mechanism in the axial and/or circumferential direction of the annular die. In an arrangement in the axial direction at a distance from or right next to the two cutting-to-length mechanism, the angle of climb of the two cutting-to-length mechanism can be kept advantageously very low. As a result of this, the pellet must travel a very long way until it is snapped by one of cutting-to-length mechanism in the axial direction, so that this separation takes place very smoothly and gently. In a spaced apart arrangement of two cutting-to-length mechanism to one another in circumferential direction from the annular die, a free space can be designed in the area of a Koller roller, so that the pellets growing radially towards the exterior in this area are not hindered by any cutting-to-length mechanism when they undergo linear expansion.

A very low angle of climb of the cutting-to-length mechanism and an associated gentle separation of the pellets from the annular die can be ensured if the two cutting-to-length mechanism are arranged parallel to one another or mirror inverted, preferably in such a way that they create a kept-apart or converging V-shape in the rotational direction of the annular die.

It is also advantageous if the cutting-to-length device is executed as an annular segment or closed ring so several cutting-to-length devices can be arranged spaced apart or next to one another in the circumferential direction of the annular die in a cutting-to-length device executed as an annular segment, for example. if the cutting-to-length device is executed as a closed ring, this cutting-to-length device can be very easily and economically replaced for retrofitting the pellet press, for example.

It is likewise advantageous if the cutting-to-length device has a fastening device in the radial direction in the fastening area to detachably fasten it to the fixed housing part of the pellet press and/or for adjusting it—especially continuously with regard to it in the radial direction. The fastening device that can be locked in place is preferably executed as a rod element extending in the radial direction that has been rotatably and axially inserted in a recess of the fixed housing part of the pellet press.

To prevent that the pellets protruding from the through-holes of the annular die are chipped off in an undefined length from already severed pellets flying around in the area between the external surface of the annular die and the radial guide area, it is advantageous if the basic body of the cutting-to-length device has at least one outlet opening and/or at least one outlet duct, especially adjoining it, for the pellets snapped off in a defined way. Here, the outlet opening has been preferably executed in such a way and/or arranged in such a way, particularly in the area of the radial guide and/or of the cutting-to-length mechanism that the severed pellets can be guided radially outwards by the centrifugal force, preferably directly, from the inner side of the cutting-to-length device facing the annular die, especially through the basic body. After the snapped-off pellets have emerged from the annular gap (i.e. from the area between annular die and cutting-to-length device) through the at least one outlet opening, they are guided by means of the at least one outlet duct to the ejection area of the pellet press, especially in the axial direction of the pellet press intended for this purpose. As a result of this, pellet congestion is advantageously prevented in the area of the cutting-to-length mechanism, so that the cutting-to-length effect of the cutting-to-length mechanism is not negatively influenced by the pellets that have already been cut to length.

In order to ensure the fastest possible discharge of the severed pellets from the annular gap or annular gap segment, it is advantageous if the outlet opening is especially arranged, directly and/or radially externally, right next to the cutting-to-length mechanism. Regarding this, it is furthermore advantageous if the outlet opening is executed between the radial inner cutting-to-length mechanism and the radial guide surface radially external to it, especially in the radial direction of the annular die.

The severed pellets can be removed quickly and gently from the annular gap if the outlet opening is arranged at an angle with regard to the radial guide surface, particularly at 90°.

The second cutting-to-length device for a pellet press according to the invention has at least one cutting-to-length device for biogenic fibrous pellets, especially wood pellets. Furthermore, the cutting-to-length device comprises at least one fastening area in which the cutting-to-length device can be fastened to a fixed housing part of the pellet press in such a way that the cutting-to-length mechanism can be arranged at a distance from a pivoted annular die of the pellet press that has radial through-holes, in the radially external area of a pivoted annular of the pellet press. The second cutting-to-length device has a basic body with an arched, concave, especially curvilinear, radial guide surface executed as a cutting-to-length mechanism.

To achieve this, the radial guide surface can be attached to the radially external area of the annular die by means of the fastening area at such a distance in the radial direction from the annular die that a pellet protruding above the annular die in its radial direction and/or pressed radially outward in the area of a Koller roller of the pellet press, comes to rest in the area of its free end on the radial guide surface area, especially against the radial guide surface, especially its front side. The pellet is capable of moving in the circumferential direction in such a way along this radial guide surface executed as a cutting-to-length mechanism that the pellet is deflected from the radial guide surface with a friction force acting on it largely in the circumferential direction of the annular die until it snaps off in the area of the annular die.

Thus, the pellet is not abruptly slowed down, but guided in the circumferential direction along the path of a defined angular area of the annular die on its front side pointing to the radial direction and facing the cutting-to-length mechanism. In this case, the pellet is increasingly deflected from its radial starting position in the circumferential direction of the annular die until the pellet snaps off gently in the annular die area or is severed by the annular die. This prevents an undefined breaking or cutting to length of the pellet into pellet pieces of varying length. As a result of this, the pellets have advantageously a certain largely constant length owing to the separation between the external perimeter of the annular die and the inner contour of the cutting-to-length mechanism or the radial guide surface executed for this purpose. As a result of this, the share of undesired "short pellets" measuring less than 14 mm can be reduced from a current average of 60% to less than 10%. In addition, the share of fine dust generated in the separation process can be reduced by up to 80%. It is thus possible to lower production costs and increase throughput.

The second cutting-to-length device, especially the radial guide surface executed as a cutting-to-length mechanism, can be arranged preferably concentrically with respect to the annular die intended for this purpose. As a result of this, the radial separation between the annular die and the radial guide surface can be maintained constant over its entire length extending in circumferential direction of the annular die. If the cutting-to-length device is arranged in an angular area of the annular die by arranging one of the Koller rollers of the pellet press, the free end area of the front side of the pellets will press against the radial guide surface owing to the lengthening done by the Koller rollers, so that in this case the radial guide surface acts as a cutting-to-length mechanism. Consequently, owing to the friction generated by this, a force acting largely in the circumferential direction acts on the free end of the pellets and is capable of gently snapping off the pellet in largely circumferential direction.

Alternatively, it can advantageously also be eccentrically arranged, however, so that the radial separation between annular die and radial guide surface changes in the circumferential direction. Advantageously, the second cutting-to-length device can therefore be positioned in such a way that a pellet approaching from the circumferential direction makes contact with the radial guide surface in its free end area and, when doing this, is snapped off in the circumferential direction. Furthermore, the curvilinear radial guide surface acts as radial guiding means both for pellets severed by the annular die and for pellets broken in the through-hole area of the annular die. As a result of this, the pellets severed by the cutting-to-length mechanism and/or broken especially by vibrations in the through-hole area do not fly radially outwards in an uncontrolled way, where they collide against sharp-edged surfaces of the pellet press and could break up into at least two fragments of undefined length. Instead, these pellets are guided through the arched radial guide surface at a defined distance to the external perimeter of the annual die in radial direction to it. It is advantageous if the radial separation between the external perimeter of the annual die and the radial guide surface is constant in the circumferential direction. Alternatively, it is also advantageous if this separation is reduced in rotational direction of the annular die, particularly from a first area to a second area of the radial guide surface, to less than 5 mm, preferably to less than 2 mm. This facilitates a gentle snapping off of the pellets.

It is furthermore advantageous if the radial guide surface extends in the radial direction of the annular die over at least its entire width. Consequently, every through-hole series can be covered by the radial guide surface.

It is advantageous if the radial guide surface is tilted, at least in one area, especially in the area of at least one of its two ends pointing in the circumferential direction, at least towards one of its two front sides pointing in the axial direction. By means of this incline of the radial guide surface running in the axial direction, severed pellets can be led away quickly from the severing area of the cutting-to-length device. Preferably (i.e. in the axial direction of the pellet press), the radial guide surface is executed in cross section obliquely, at least in the direction of one of its front sides, Preferably, it is executed obliquely towards both of its front sides, so that it has preferably an essentially gabled form. As a result of this, the pellets can be quickly led away towards their two front sides, thus preventing the pellets already cut to length from negatively influencing the cutting-to-length process.

It is advantageous if the second cutting-to-length device is executed like the first cutting-to-length device of the previous description, in which case the mentioned characteristics can be present individually or in any combination.

It is advantageous if the second cutting-to-length device is executed as an annular segment.

According to the invention, an embodiment of the pellet press for pressing biogenic fibrous pellets, especially wood pellets, has a rotating annular die, a Koller roller and a cutting-to-length device. The rotatable annular die has largely radial through-holes and creates in its interior a pressing chamber to which biogenic fibrous press material can be supplied. The stationary Koller roller is arranged eccentrically with regard to the annular die and is capable of rolling off on its internal perimeter in such a way that the press material can be pressed through the through-holes for creating the pellets. The cutting-to-length device has at least one cutting-to-length mechanism and has been fastened to a fixed housing part of the pellet press in such a way that the cutting-to-length mechanism is arranged in the radially external area of the pivoted annual die and spaced from it. As a result of this, an annular gap is advantageously created between the external perimeter of the annular die and the internal perimeter of the cutting-to-length mechanism. According to the invention, the pellet press has at least a first cutting-to-length device according to the preceding description and/or a second cutting-to-length device according to the preceding description, in which case both the features mentioned above can be present in the first and second cutting-to-length devices individually or in any combination.

It is advantageous if the first and/or second cutting-to-length device is executed as an annular segment. Thus, the cutting-to-length device can be adapted especially for the conditions existing in the corresponding angular area. Therefore, the first cutting-to-length device lends itself especially to be arranged in the circumferential direction of the annular die in the area—particularly in the angular area— between two adjoining Koller rollers and/or the second cutting-to-length device to be in the area—particularly in the angular area—of the corresponding Koller roller.

So the severed pellets do not fly uncontrollably inside the press housing, it is advantageous for the cutting-to-length devices to create a closed ring, especially at least in their radial guide surfaces. For this, they are advantageously arranged to overlap in each case towards their contiguous cutting-to-length device, directly adjoining and/or at least partially overlapping.

It is advantageous if the cutting-to-length mechanism of the first cutting-to-length device extends in such a way over the area of at least one of the through-holes in the axial and circumferential direction of the annular matrix that a pellet, which protrudes above the annular die in its radial direction with a longer length than the separation between the annular die and the cutting-to-length mechanism, comes to rest with its free end area on the cutting-to-length mechanism and is capable of moving along it in the circumferential direction in such a way that the pellet is deflected by the cutting-tolength mechanism with a force having an axial component, so that it snaps off in the annular die area. The pellet is therefore not slowed down abruptly, but guided in the circumferential direction along the path of a defined angular area of the annular die, which can be especially influenced by the angle of climb of the helical cutting-to-length mechanism, and at the same time is in this case increasingly being deflected from its radial starting point until the pellet gently snaps off or is severed by the annular die. As a result of this, an undefined breaking or cutting-to-length of the pellet into pieces of varying length is prevented. Consequently, the pellets have advantageously a largely constant length or one within a spectrum determined by the separation. In this way, the share of undesired "short pellets" measuring less than 14 mm can be reduced from a current average of 60% to less than 10%. Furthermore, the share of fine dust generated during the severing process can be reduced by up to 80%, thus lowering production costs and increasing throughput.

Moreover, the severed pellets are guided in the axial direction of the annular die by means of the cutting-to-length mechanism extending helically, thereby preventing the severed pellets from being thrown in an undefined way to pellet press areas not intended for this purpose, where they could be damaged or also broken up into at least two shorter pellet pieces of undefined length. The cutting-to-length mechanism is therefore shaped in such a way that the pellets are snapped off gently and guided axially to an ejection area of the pellet press.

It is advantageous if the separation in radial direction of the annular die between cutting-to-length mechanism and the annular die intended for this purpose is largely constant in the area of at least one of the radial through-holes or over the minimum length L of the cutting-to-length mechanism needed for snapping off a pellet. This can ensure that the pellet to be snapped off comes to rest on the cutting-to-length mechanism immediately after reaching the area of the cutting-to-length mechanism and is guided by it over its entire snapping-off length L.

If the cutting-to-length mechanism has been executed to be long in such a way that it extends over the area of at least two radial through-holes or two bore rings (which are executed by the through-holes arranged one after the other in circumferential direction), it is advantageous if the separation between the cutting-to-length mechanism and annular die remains constant over the entire length. Thus, the pellets sheared-off in the area of the first through-hole or first bore ring have the same length as those sheared off in the area of the second through-hole or second bore ring.

Alternatively or additionally, the largely arched contour of the cutting-to-length mechanism can be also executed in such a way, however, that the separation between the cutting-to-length mechanism and annular die is executed variably so that the separation between cutting-to-length mechanism and annular die is smaller or larger in the area of a first bore ring than the separation between these two in the area of a second bore ring. Advantageously, the cutting-to-length mechanism is executed in a stepped way in the area of the arched contour for this purpose, and/or falling or rising, especially linearly or wavy, from one end of the cutting-to-length mechanism to its other end. Advantageously, the pellets are therefore not severed with the same length by the annular die, but within a length spectrum, that can be influenced by the design of the arched contour. Consequently, the pellets severed by the cutting-to-length mechanism in the area of the first bore ring have a different length to one another compared to those pellets severed in the area of the second bore ring.

The separation between annular die and cutting-to-length mechanism has been preferably designed in an essentially constant way. However, it is also conceivable for the separation to change in the circumferential direction and be especially larger or smaller. Furthermore, the cutting-to-length mechanism can be executed in different areas with different-sized separations to the annular die. As a result of this, a length distribution of the pellets severed by the annular die determined by the separation of the cutting-to-length mechanism or the area of the cutting-to-length mechanism to the annular die can be brought about. Thus, it is advantageous for the pellets' flow property if all of them do not have the same length are created within the area of a length spectrum.

It is advantageous if the cutting-to-length device executed as an annular segment extends between two contiguous Koller rollers in the circumferential direction of the annular die mostly over an angular area of 120° or 180°. As a result of this, several ring segments can be arranged in especially two or three Koller rollers in the area of the outer perimeter of the annular die that they do not extend into the area of the Koller rollers, where the pellets grow radially outward by being pressed through the through-holes. Furthermore, the ring segments are therefore sufficiently long in the circumferential direction of the annular die so they can be capable of achieving the smallest possible angle of climb of the helically designed cutting-to-length mechanism.

It is also advantageous if at least two cutting-to-length devices executed as ring segment and/or as closed ring are arranged spaced apart or contiguously in the axial and/or circumferential direction of the annular die.

Advantageously, the cutting-to-length mechanism of a first cutting-to-length device is executed as a shoulder or rib, and the cutting-to-length mechanism of a second cutting-to-length device spaced apart or contiguous to it in the circumferential direction is executed as a groove. Thus, the pellets protruding radially above the annual die are at first snapped off by the first cutting-to-length device, so that they loosen from the annular die. Owing to vibrations, it can happen that the pellets that do not have the desired length yet break in the through-hole. As soon as they break, they are carried outward radially by the centrifugal force and make contact with the radial guide surface that guides them in the radial direction. Once the broken pellets reach the area of the second cutting-to-length device created with the groove, they penetrate it and are deflected axially in such a way owing to their helical shape that they snap off in a defined length in the annular die area.

It is advantageous if the cutting-to-length device is arranged so it is separated from the annular die by 18-22 mm. In tests, it has been determined that it is very convenient to have a separation of 18 mm because in this case, a pellet length of about 22-26 mm is obtained, which largely corresponds to the ideal pellet length.

It is advantageous if the contact surface is oblique in the area of the edge surface so it can largely be prevented that pellets ascending above the snapping edge located in the back queue up with their free end.

Values from 0.5 to 1×D (pellet diameter) have proven to be advantageous for the depth of the groove; for the groove's width about 1.5×D to 3×D.

BRIEF DESCRIPTION OF THE DRAWINGS

Additional advantages of the invention are described in the following embodiments, which show.

DETAILED DESCRIPTION

Figure 1:
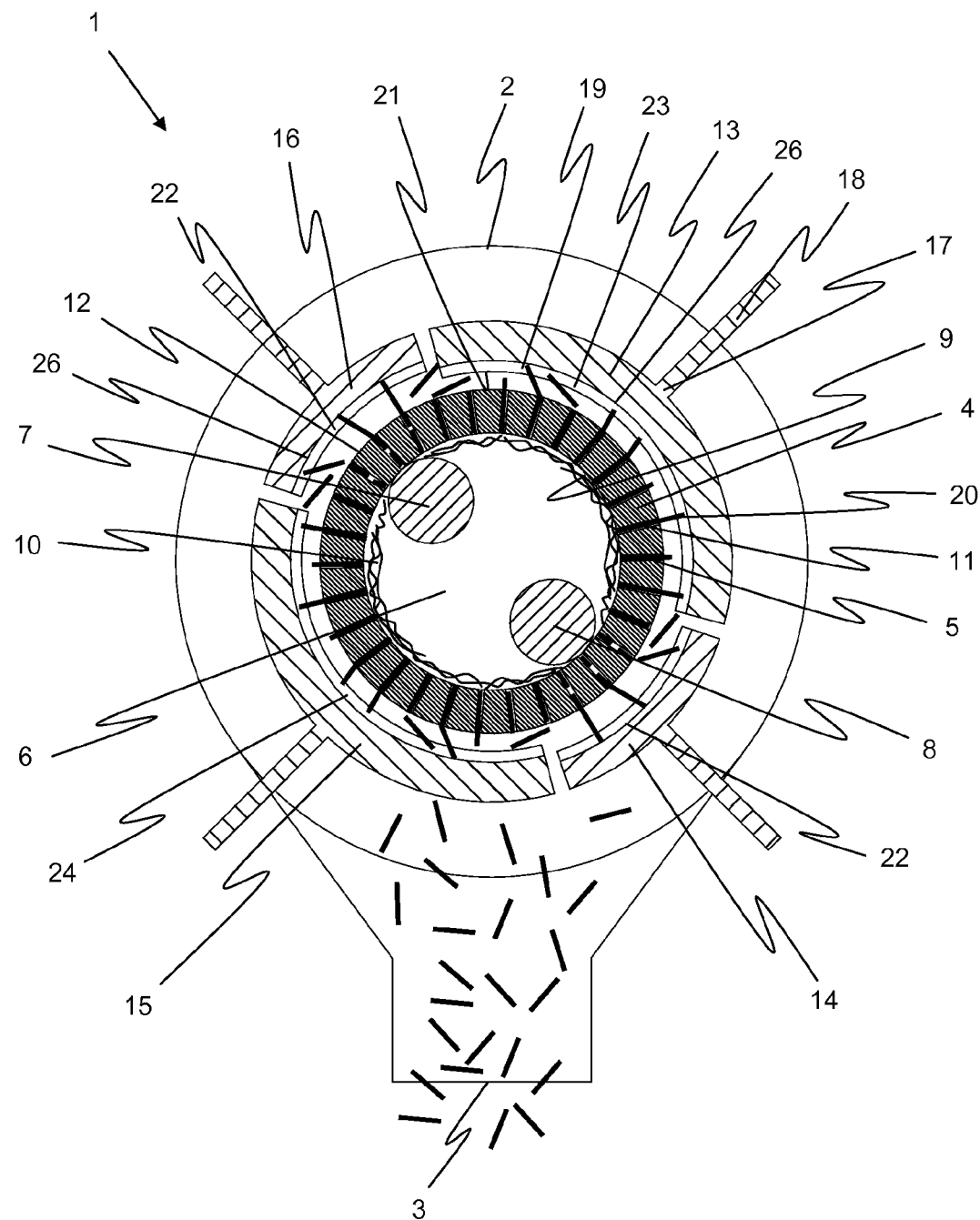
FIG. 1 is a schematic representation of a pellet press in cross section.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

The subsequent drawings describe two alternative cutting-to-length devices, namely a first cutting-to-length device 13 and a second cutting-to-length device 14. They can be used simultaneously in a pellet press 1, in which case they are arranged with respect to one another in the circumferential direction of the pellet press 1 in different angular areas (cf. FIG. 1). The first cutting-to-length device 13 is preferably arranged in the area between two Koller rollers 7, 8. Embodiments of various designs are shown in FIGS. 2, 3, 5, 7, 8, 10 and 11. In this case, the cutting-to-length device 13 has a radial guide surface 26 in all embodiments on whose concave interior surface a cutting-to-length mechanism 19 has been arranged. According to the embodiments, the cutting-to-length mechanism 19 can protrude radially as a shoulder or rib above the radial guide surface 26 (cf. FIGS. 2, 3, 7, 8, 10, 11) and/or has been executed in the guide surface 26 as a depression, especially as a groove and/or slit (cf. FIG. 5).

Figure 12:
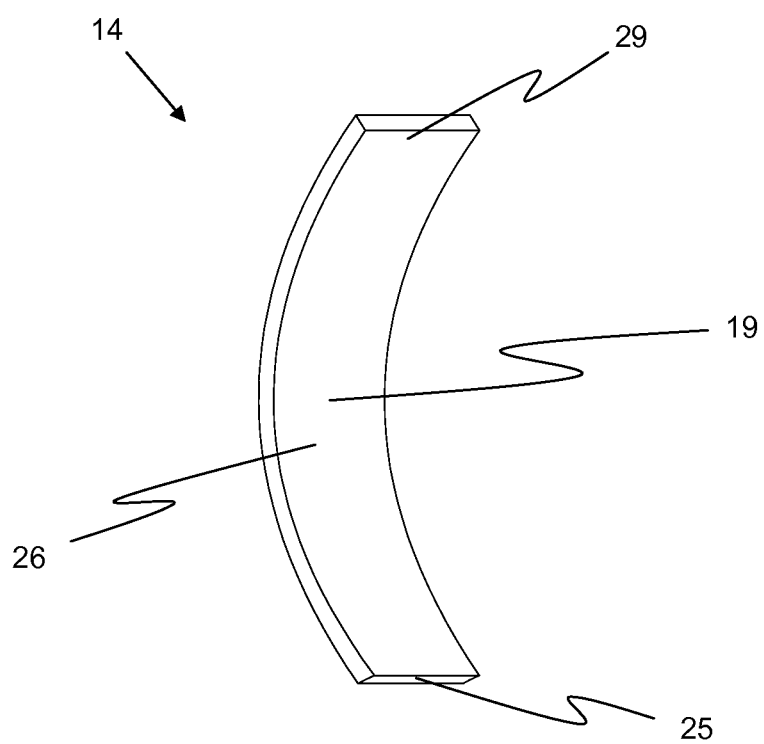
FIG. 12 is a second cutting-to-length device arranged in circumferential direction of the annular die in the area of a Koller roller with a radial guide surface executed as cutting-to-length mechanism.
Figure 13:
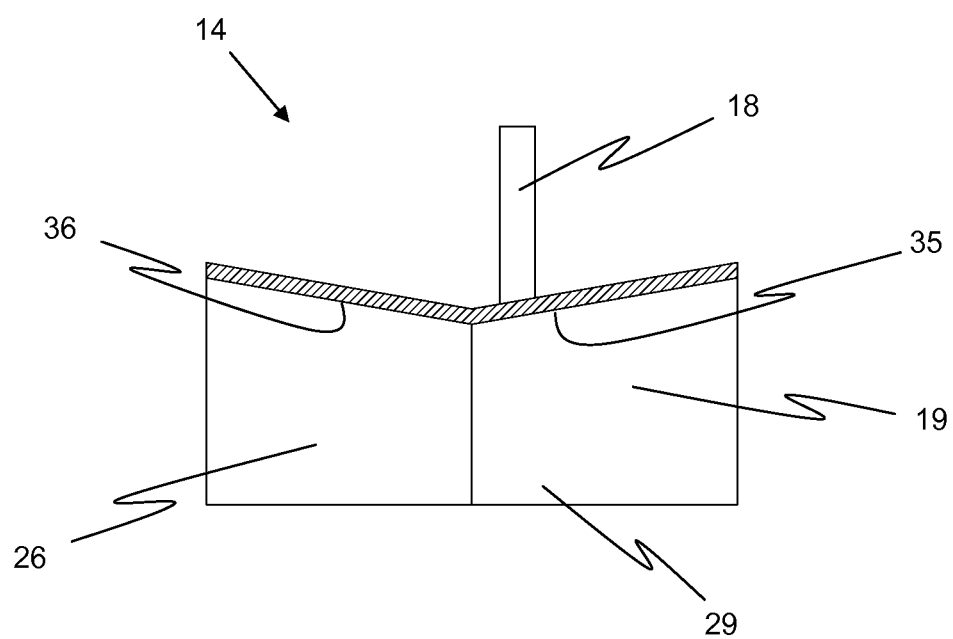
FIG. 13 is an alternative embodiment of the second cutting-to-length device in cross section with a radial guide surface shaped like a gabled roof and executed as cutting-to-length mechanism.

Contrary to the first cutting-to-length device 13, the second cutting-to-length device 14 is preferably arranged in the circumferential direction of the pellet press 1 in the area above one of the Koller rollers 7, 8. Just like the first cutting-to-length device 13, the second cutting-to-length device 14 has a radial guide surface 26, which is executed as a cutting-to-length mechanism 19. For this, it has been especially arranged in the area, especially above a Koller roller 7, 8. Different embodiments of the second cutting-to-length device 14 is shown in FIGS. 12 and 13. Here, the cutting-to-length device 14 has only the radial guide surface 26 executed for this purpose as the cutting-to-length mechanism. A variant of the former can be executed in the form of a gabled roof.

FIG. 1 shows a schematic representation of a pellet press 1 in cross section. The pellet press 1 has a housing part 2 that has been executed in a largely circular and stationary way and has an ejection opening 3 in its lower area. In the interior of the stationary housing part 2, a motor-driven, rotatable annular die 4 has been arranged. The annular die 4 has radial through-holes 5 distributed across its entire perimeter that extend radially outwards from a press space 6 formed within the annular die 4. Inside the press space 6, two spaced apart Koller rollers 7, 8 have been arranged. The two Koller rollers 7, 8 are eccentrically arranged with respect to the annular die 4 and roll off on the inner perimeter 9 of the annular die 4.

Biogenic, fibrous press material 10 is introduced into the press space 6 by a conveyor device not shown here. Owing to the centrifugal force, the press material 10 accumulates on the inner perimeter 9 of the quickly rotating annular die 4. The press material 10 is radially pressed outward through the through-holes 5 of the annular die 4 in the area of the two Koller rollers 7, 8 and pellets 11 are formed as a result of this. These pellets extend largely across the entire length of the through-hole 5 and partially protrude radially over the external perimeter 12 of the annular die 4. To maintain clarity, only one of the pellets 11 has been identified.

Four cutting-to-length devices 13, 14, 15, 16 have been arranged in the radially outer area of the annular die 4 and spaced apart from it in radial direction. Each one of the cutting-to-length devices 13, 14, 15, 16 has in its radially external area a fastening area 17, in which a fastening device 18 has been executed (for maintaining clarity, once again only one of the cutting-to-length devices 13, 14, 15, 16 has been identified here). Each one of the cutting-to-length devices 13, 14, 15, 16 is fixedly connected to the housing part 2 with its corresponding fastening device 18. The fastening device 18 comprises an adjustment device (not shown here) so each one of the cutting-to-length devices 13, 14, 15, 16 can be radially moved or displaced, preferably continuously. Thus, by means of the adjustment device, the distance between the external perimeter 12 of the annular die 4 and the respective cutting-to-length device 13, 14, 15, 16 can be adjusted. By means of the separation between the annular die 4 and the respective cutting-to-length device 13, 14, 15, 16, it is possible to adjust the length of the pellets 11 to be severed in the corresponding area. Each one of the cutting-to-length devices 13, 14, 15, 16 has a radial guide surface 26 for the radial guiding of the pellets 11. The separations of the radial guide surfaces 26 of the four cutting-to-length devices 13, 14, 15, 16 to the external perimeter 12 of the annular die 4 have a largely equal and/or constant design in this embodiment. Thus, the radial guide surfaces 26 together constitute a circumferential, especially for the most part closed radial guide surface. The cutting-to-length devices 13, 14, 15, 16 are preferably closely spaced apart by preferably less than 60 mm. This arrangement can prevent their mutual collision and blockage when they are adjusted in the radial direction. Alternatively, however, they can also be directly contiguous to one another or their free ends can overlap partially. It is also conceivable for the cutting-to-length devices 13, 14, 15, 16 to be arranged at different distances from one another from the annular die 4.

The cutting-to-length devices 13, 14, 15, 16 have a cutting-to-length mechanism 19 with a concave arched contour 21 in their radially inner area. As will later be explained in detail, the cutting-to-length mechanism 19 is executed as first cutting-to-length mechanism, so that they extend for the most part helically in axial direction of the annular die 4.

According to the above, a pellet 11 pressed radially through one of the through-holes 5 by the two Koller rollers 7, 8 makes contact with one of the first cutting-to-length devices 13, 14, 15, 16 when it protrudes radially more than the adjusted separation between the external perimeter 12 of the annular die 4 and the cutting-to-length mechanism 19 arranged at a distance to it. When the annular die 4 keeps rotating, the pellet 11 comes to rest in the area of its free end 20 on the helically executed cutting-to-length mechanism 19, especially in the area of its largely cylindrical side surface and moves along it in the circumferential direction of the annular die 4 over a defined angular interval. Owing to the cutting-to-length mechanism 19 extending helically in the axial direction of the annular die 4, the free end 20 area of the pellet 11 is largely deflected in the axial direction of the annular die 4. The force of the cutting-to-length mechanism 19 that has mostly an axial component causes the pellet 11 to snap off in a defined length in the area of the external perimeter 12 of the annular die 4 (cf. FIGS. 4a-4c and FIGS. 6a-6d). This snap-off process is very gentle, so that the pellets 11 manufactured with this device have a largely constant length.

In the present case, the cutting-to-length devices 13, 14, 15, 16 are executed as ring segments and arranged to be distributed across the perimeter of the annular die 4 in different angular intervals. Each one of the two cutting-to-length devices 13, 14, 15, 16 arranged contiguously to one another are spaced apart in the circumferential direction. In an alternative embodiment, however, they can also be directly contiguous to one another, thus forming a multi-part closed ring segment over its circumference that comprises the first, second, third and fourth cutting-to-length device 13, 14, 15, 16.

In the embodiment shown in FIG. 1, the cutting-to-length devices 14, 16 have a cutting-to-length mechanism 19 executed as groove 22 (cf. FIG. 5) arranged in the area of the two Koller rollers 7, 8. Contrary to this, the cutting-to-length devices 13, 15 circumferentially arranged contiguously to, or spaced apart from, the Koller rollers 7, 8 have a cutting-to-length mechanism 19 executed as a rib 23 and/or shoulder 24 (cf. FIGS. 2 and 3). Compared to the other two cutting-to-length devices 13, 15, the two cutting-to-length devices 14, 16 arranged in the area of the Koller rollers 7, 8 are at a greater distance from the external perimeter 12 of the annular die 4. Thus, the second and fourth cutting-to-length device 14, 16 does not prevent the pellets 11 growing radially outward in the area of the Koller rollers 7, 8 to keep lengthening. Once they have reached the correspondingly adjusted length, they are snapped off in a defined way by the helically designed cutting-to-length mechanism 19 in the area of the first and/or third cutting-to-length device 13, 15.

Contrary to this, the second and fourth cutting-to-length device 14, 16 executed with a groove 22 are essentially for severing the pellets 11 broken in the through-hole 5 in a defined length from the annular die 4. Thus, owing to the centrifugal force, these broken pellets 11 are pressed radially outwards against the second and fourth cutting-to-length device 14, 16, in which case they engage in the groove 22 and are snapped off largely in the axial direction.

Alternatively, however, the two cutting-to-length devices 14, 16 arranged in the area of the Koller 7, 8 rollers can also be executed without this groove 22. In this case, these cutting-to-length devices 14, 16 largely comprise the radial guide surface 26 only for guiding and cutting the pellets 11 to length. Accordingly, the concave and/or arched, especially curvilinear, radial guide surface 26 is executed as the cutting-to-length mechanism 19. For this, the radial guide surface 26 is concentrically arranged with respect to the annular die 4 intended for this purpose, so that the radial separation between the annular die 4 and the radial guide surface 26 is constant across its entire length extending in circumferential direction of the annular die 4. To act as a cutting-to-length mechanism 19, the radial guide surface 26 is furthermore attached at such separation in the radially external area of the annular die 4 by means of the fastening area 17 that a pellet 11 protrudes above the annular die 4 in its radial direction and is pressed radially outward against the radial guide surface 26 in the area of a Koller roller 7, 8 of the pellet press 1, coming to rest in the area of its free end with its front side on the radial guide surface 26. When the annual die 4 is rotated, the pellet 11 moves circumferentially on the radial guide surface 26 executed as a cutting-to-length mechanism 19 in such a way that the pellet 11 is deflected from the radial guide surface 26 by a friction force acting largely in the circumferential direction of the annual die 4 until it is snapped off in the area of the annular die 4. Thus, the pellet is not abruptly slowed down, but gently severed by the annular die 4. As a result of this, an undefined breaking or cutting-to-length of the pellets 11 in pellet pieces of various lengths is prevented.

Alternatively, however, the radial guide surface 26 can also be arranged eccentrically, so that the radial separation between annular die 4 and radial guide surface 26 changes in the circumferential direction, especially in the rotational direction of the annular die 4. As a result of this, a pellet 11 approaching in the circumferential direction always collides in the area of its free end with the radial guide surface 26, as a result of which it is snapped off in the circumferential direction. This alternative embodiment could be used, for example, in the angular area between the two Koller rollers 7, 8.

This invention is not restricted to the spatial arrangement of the four cutting-to-length devices 13, 14, 15, 16 and their respective execution, especially of the respective cutting-to-length mechanism 19, shown exemplarily in FIG. 1. Thus, the number of cutting-to-length devices 13, 14, 15, 16 spaced apart in circumferential direction from the annular die 4 and the angular area encompassed by them can vary arbitrarily. Furthermore, the cutting-to-length mechanism 19 of the respective cutting-to-length devices 13, 14, 15, 16 can be executed differently according to the description given below. Thus, the cutting-to-length devices 13, 14, 15, 16 can be executed as first cutting-to-length devices according to the embodiment described above (cf. FIGS. 2, 3, 5, 7, 8, 10 and 11). Alternatively, all or only some of the cutting-to-length devices 13, 14, 15, 16 can be executed as second cutting-to-length devices, which will then have essentially only one radial guide surface executed as cutting-to-length mechanism (cf. FIGS. 12 and 13). In a preferred embodiment, the cutting-to-length devices 14, 16 of FIG. 1 arranged in each case in the area of the Koller rollers 7, 8 are executed as first cutting-to-length mechanism. To do this, the radial guide surface 26 can be attached by means of the fastening area 17 in the radially external area of the annular die 4 at such distance, that when a pellet 11 protruding above the annular die 4 in the radial direction and/or radially outward in the area of a Koller roller 7, 8 of the pellet press 1, is pressed especially against the radial guide surface 26, in the area of its free end, especially its front side, comes to rest on the radial guide surface 26. The pellet 11 is capable of moving in the circumferential direction along this radial guide surface 26 executed as a cutting-to-length mechanism 19 in such a way that the pellet 11 is deflected from the radial guide surface 26 by means of a friction force acting essentially in the circumferential direction of the annular die 4 until it snaps off in the area of the annular die 4. The pellet 11 is therefore not slowed down abruptly, but guided in the circumferential direction along the path of a defined angular area of the annular die 4 on its front side facing the cutting-to-length mechanism 19 pointing in the radial direction. In this case, the pellet 11 is increasingly deflected from its radial starting position in the circumferential direction of the annular die 4 until the pellet 11 is snapped off gently in the area of the annular die 4 or is severed by the annular die 4.

Figure 2:
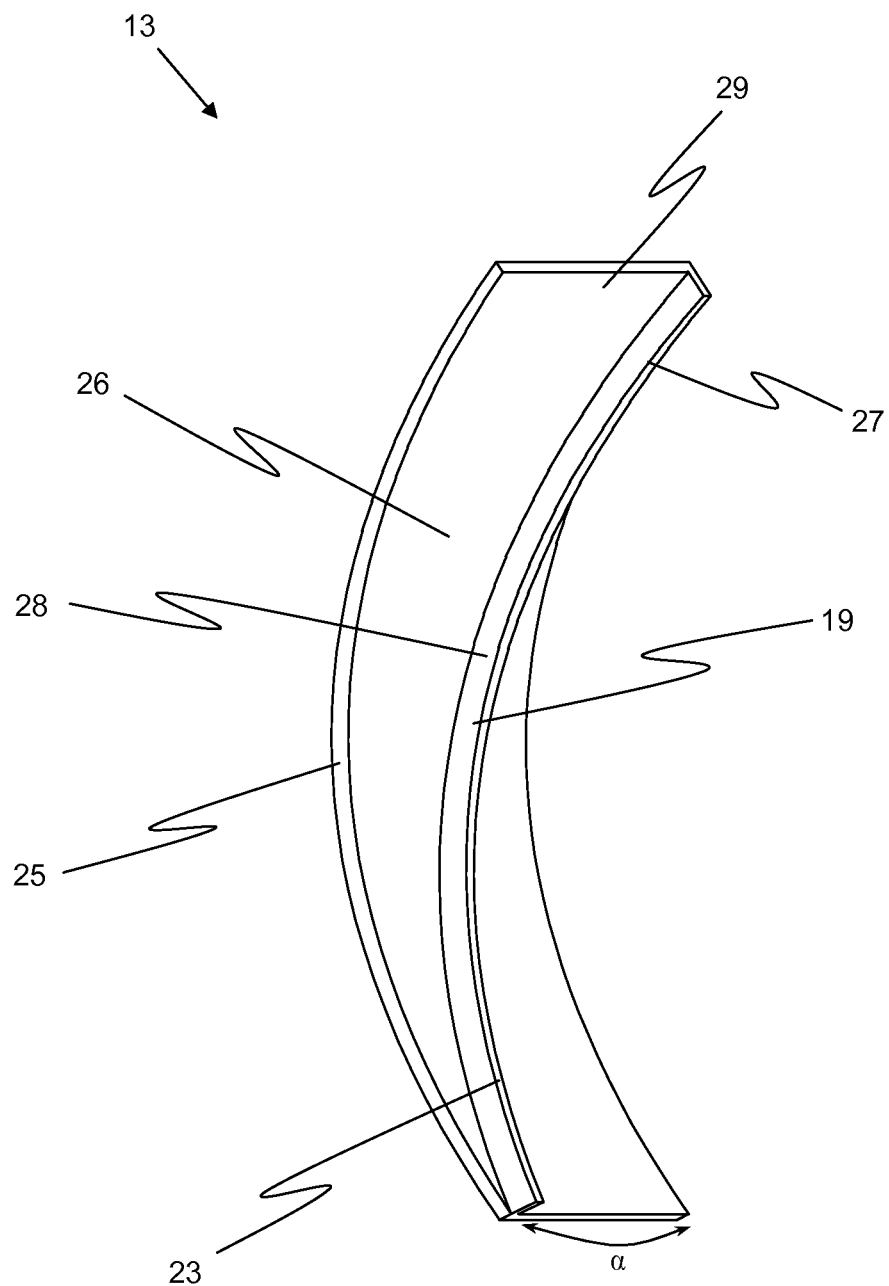
FIG. 2 is a perspective representation of a first cutting-to-length device with a cutting-to-length mechanism executed as rib.

FIG. 2 shows a first embodiment of the cutting-to-length device 13 with a basic body 25 that has a concave curvilinear radial guide surface 26 on the side facing the annular die 4. The cutting-to-length mechanism 19, which has a helical design, is executed in the area of the radial guide surface 26. It therefore extends, as part of a screw area, in the axial direction of the annular die 4 not shown here (cf. FIG. 1) or largely helically over at least one area of the curvilinear radial guide surface 26. The cutting-to-length mechanism 19 has an angle of climb α.

The cutting-to-length mechanism 19 of the cutting-to-length device 13 has been executed as rib 23. The rib 23 rises, starting from the radial guide surface 26, inward towards the annular die 4 intended for the purpose (cf. FIG. 1). The cutting-to-length mechanism 19 executed as a rib 23 comprises an edge surface 27 and contact surface 28 essentially extending over its entire length.

The cutting-to-length device 13 executed as a ring segment here has, in the area of its two ends, a feed opening 29 from which side the pellets 11 (not shown here) enter the area of the cutting-to-length device 13. During their further movement in the circumferential direction of the cutting-to-length device 13, the pellets 11 slide along abutting the contact surface 28 and/or the edge surface 27, in which case they are deflected in the axial direction in such a way owing to the helical design of the contact surface 28 and/or the edge surface 27 of the cutting-to-length mechanism 19 that they snap off in the area of the annular die 4.

The first embodiment of the cutting-to-length device 13 shown in FIG. 2 has the advantage—owing to the rib 23—of having only a small surface that protrudes above the radial guide surface 26. Consequently, this embodiment can be very conveniently arranged in the area of the Koller rollers 7, 8 (cf. FIG. 1) because, as a result of this, only a minuscule proportion of the pellets 11 are hindered in their radial growth.

FIGS. 3, 5, 7 and 8 show more embodiments of the cutting-to-length device 13, in which case the same reference characters are used for the same features. As far as these are not explained in detail once again, their design and mode of operation corresponds to their design and mode of operation of the features already described above.

Figure 3:
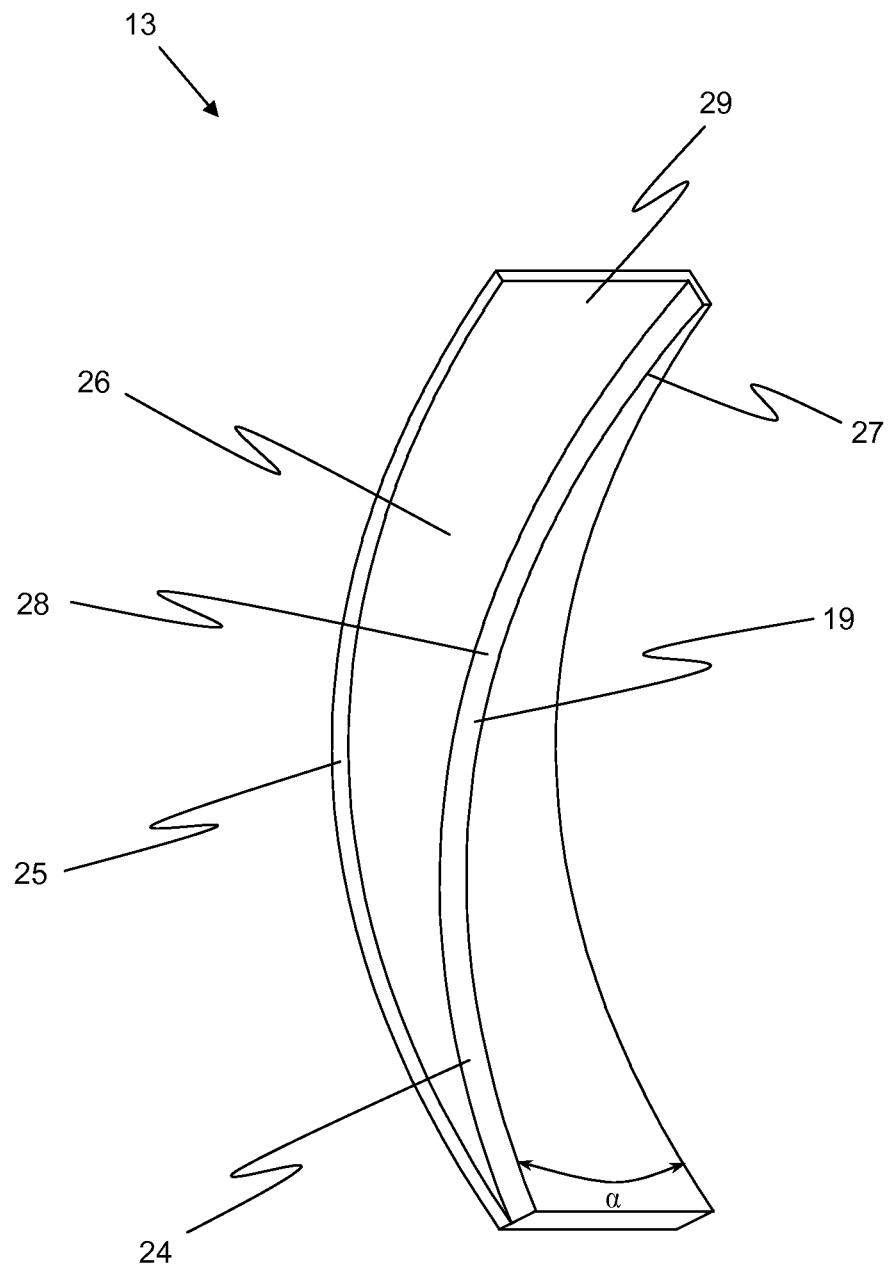
FIG. 3 is a perspective representation of a first cutting-to-length device with a cutting-to-length mechanism executed as shoulder.

Thus, FIG. 3 shows an alternate second embodiment of the cutting-to-length device 13 in which the cutting-to-length mechanism 19 is executed as a shoulder 24, which imparts the cutting-to-length device 13 a very sturdy design, so that the contact surface 28 does not bend with respect to the radial guide surface 26.

Figure 4A:
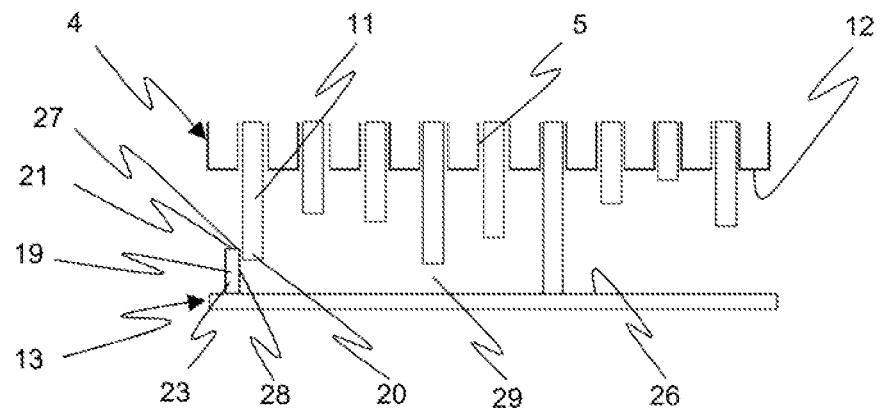
FIG. 4a-4c are sequential representations of the snapping-off process in a cutting-to-length mechanism executed as rib of a first cutting-to-length device.
Figure 4B:
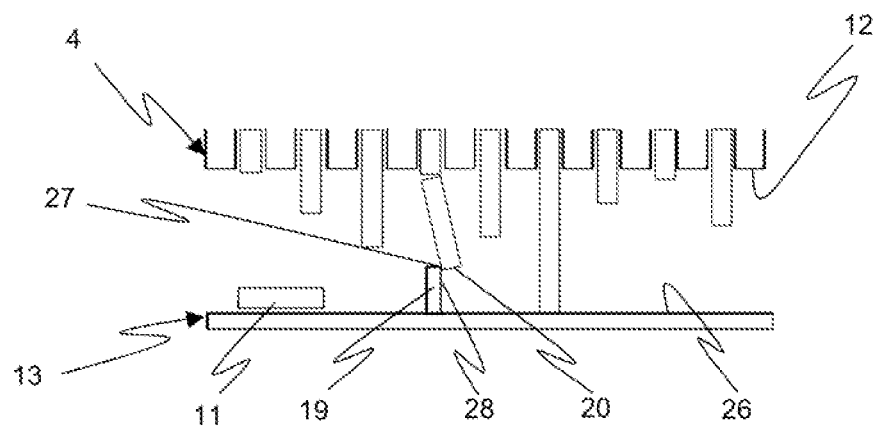
Figure 4C:
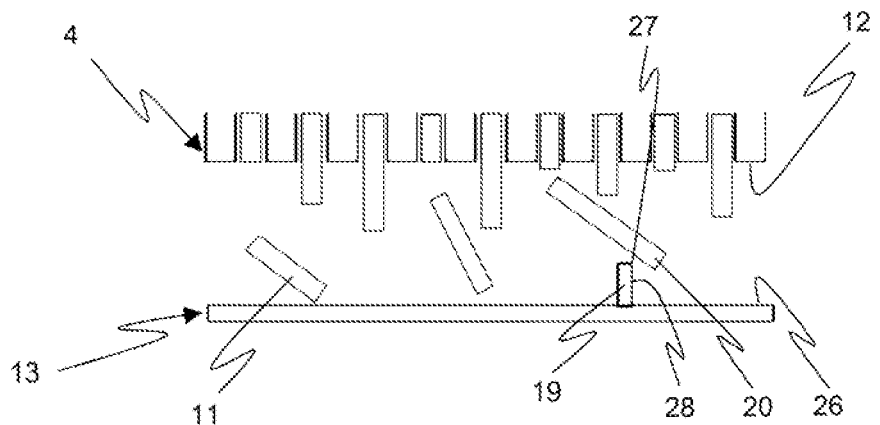

FIGS. 4a to 4c illustrate sequentially the mode of operation of the cutting-to-length mechanism 19 executed as a rib 23 in FIG. 2. The mode of operation of the second alternate embodiment shown in FIG. 3 (in which the cutting-to-length mechanism 19 is executed as shoulder 24) is identical to it.

Thus, according to FIG. 4a, the Koller rollers 7, 8 not shown here press the pellets 11 radially outward through the through-holes 5, so that they protrude in different lengths above the external perimeter 12 of the annular die 4. However, the pellets 11 are supposed to be severed by the annular die 4 starting at a predetermined length, determined by the distance between the external perimeter 12 of the annular die 4 and the arched contour 21 of the cutting-to-length mechanism 19. Thus, as the annular die 4 keeps rotating, the pellets 11 in the area of the feeding opening 29 come to rest opposite the cutting-to-length device 13 in the area of the cutting-to-length 19. If the pellets 11 protrude above the annular die 4 in its radial direction with a greater length than the distance between annular die 4 and cutting-to-length mechanism 19, they come to rest in the area of their free ends 20 on the edge surface 27 and/or contact surface 28 of the cutting-to-length mechanism 19.

When the annular die 4 keeps rotating, the pellets 11 move along the cutting-to-length mechanism 19 abutting to it. Owing to the helical design of the cutting-to-length mechanism 19, it moves in the axial direction of the annular die 4 at a constant distance to it, from one of its two front sides to the other (cf. FIGS. 4a to 4c). In this case, a force initiated in the axial direction by the cutting-to-length mechanism 19 deflects the pellets 11 having a certain minimum length so strongly that they are snapped off in the area of the external perimeter 12 of the annular die 4 (cf. FIG. 4b).

As soon as the pellets 11 are severed by the annular die 4 according to FIG. 4b, the radial guide surface 26 guides them in the radial direction. As a result of this, it is prevented that the severed pellets 11 are thrown at high speed against the stationary housing part 2 of the pellet press 1, where they could break up into additional smaller pieces (cf. FIG. 1).

Figure 5:
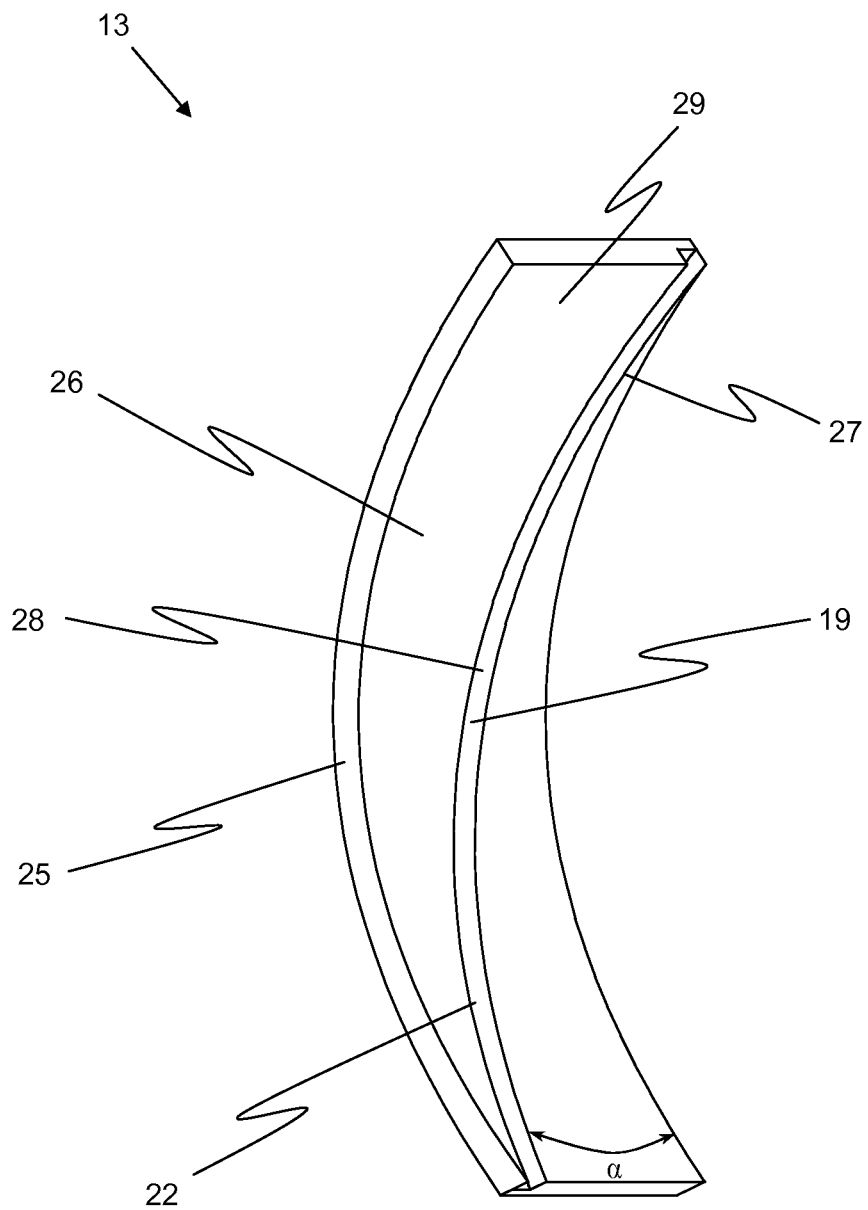
FIG. 5 is a perspective representation of an alternative embodiment of the first embodiment of the first cutting-to-length device with a cutting-to-length mechanism executed as groove.

In a third embodiment of the cutting-to-length device 13 shown in FIG. 5, the cutting-to-length mechanism 19 has been executed as a groove 22. By mechanism of the sequential snapping-off process shown in FIGS. 6a to 6d, it can be recognized that the cutting-to-length mechanism 19 executed as groove 22 has been made to sever in a defined length especially the pellets 11 already broken in the through-hole 5 by the annular die 4.

Figure 6A:
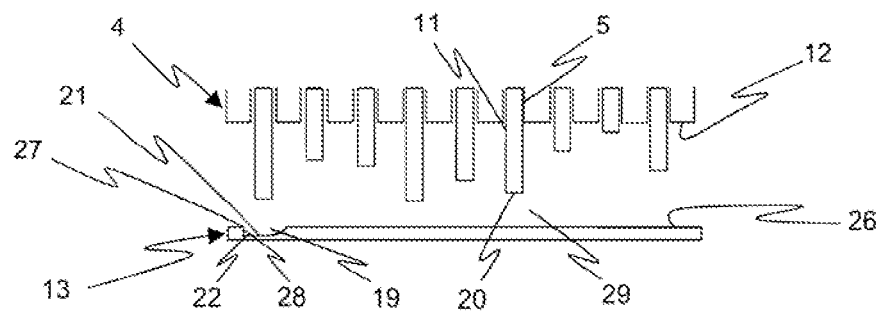
FIG. 6a-6d are sequential representations of the snapping-off process in a cutting-to-length mechanism executed as groove.
Figure 6B:
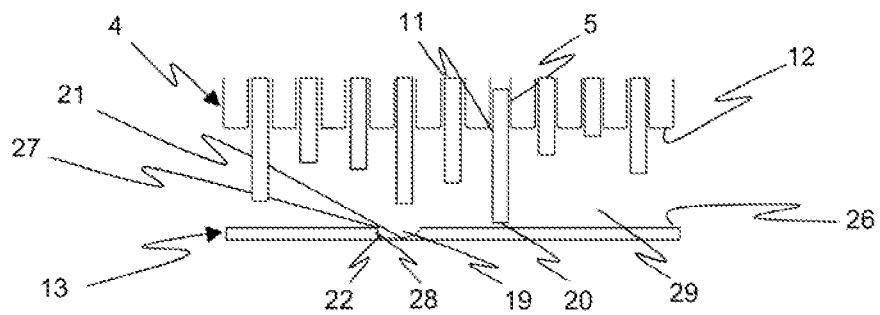
Figure 6C:
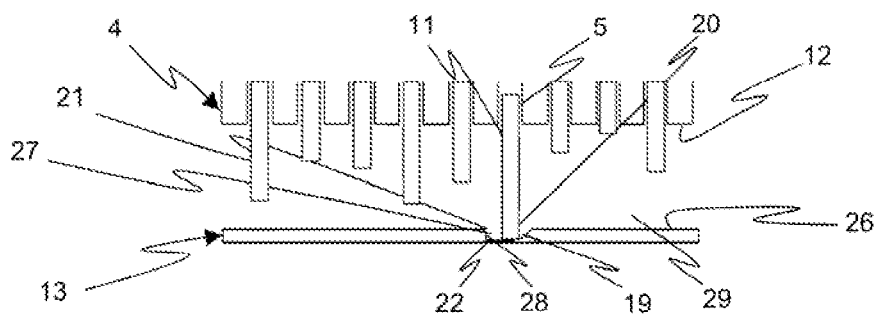
Figure 6D:
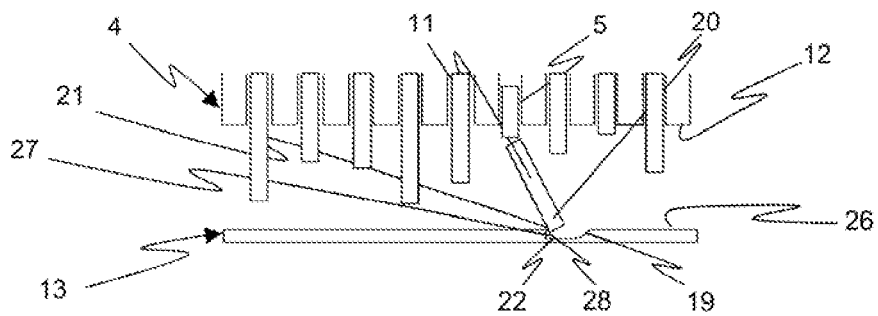

Thus, according to FIG. 6a, at first no pellet 11 rests with the area of its free end 20 on the radial guide surface 26. However, owing to vibrations, individual pellets 11 may break in the area of the through-hole 5 and be moved radially outwards by the centrifugal force. In this case, according to FIG. 6b, the radial guide surface 26 hinders them from being thrown uncontrollably in the radial direction. Thus, these broken pellets 11 come to rest with their free end 20 area on the radial guide surface 26, which then leads them in the radial direction.

The helical design of the cutting-to-length mechanism 19 executed as a groove 22 makes the groove move towards the pellets 11 when the annular die 4 keeps rotating axially. According to FIG. 6c, as soon as the cutting-to-length mechanism 19 arrives at the area where the pellets 11 have come to rest on the radial guide surface 26, the pellet 11 penetrates the groove 22 owing to the centrifugal force 22. In this case, the free end 20 of the pellet 11 makes contact with the edge surface 27 and/or contact surface 28 and moves along it in the circumferential direction at least partially.

The cutting-to-length mechanism 19 acts with its edge surface 27 and/or contact surface 28 with a force having an axial component on the pellet 11 in the area of its free end 20. As a result of that, the pellet 11 is deflected so much according to FIG. 6d until it is snapped off in the area of the external perimeter 12 of the annular die 4 and detached from it. After severing, the severed pellet 11 rests with its longitudinal side on the radial guide surface 26. Therefore, the radial guide surface 26 prevents the severed pellet 11 from being uncontrollably thrown with full force against housing parts of the pellet press 1, thereby possibly breaking the pellet 11 into smaller parts.

Figure 7:
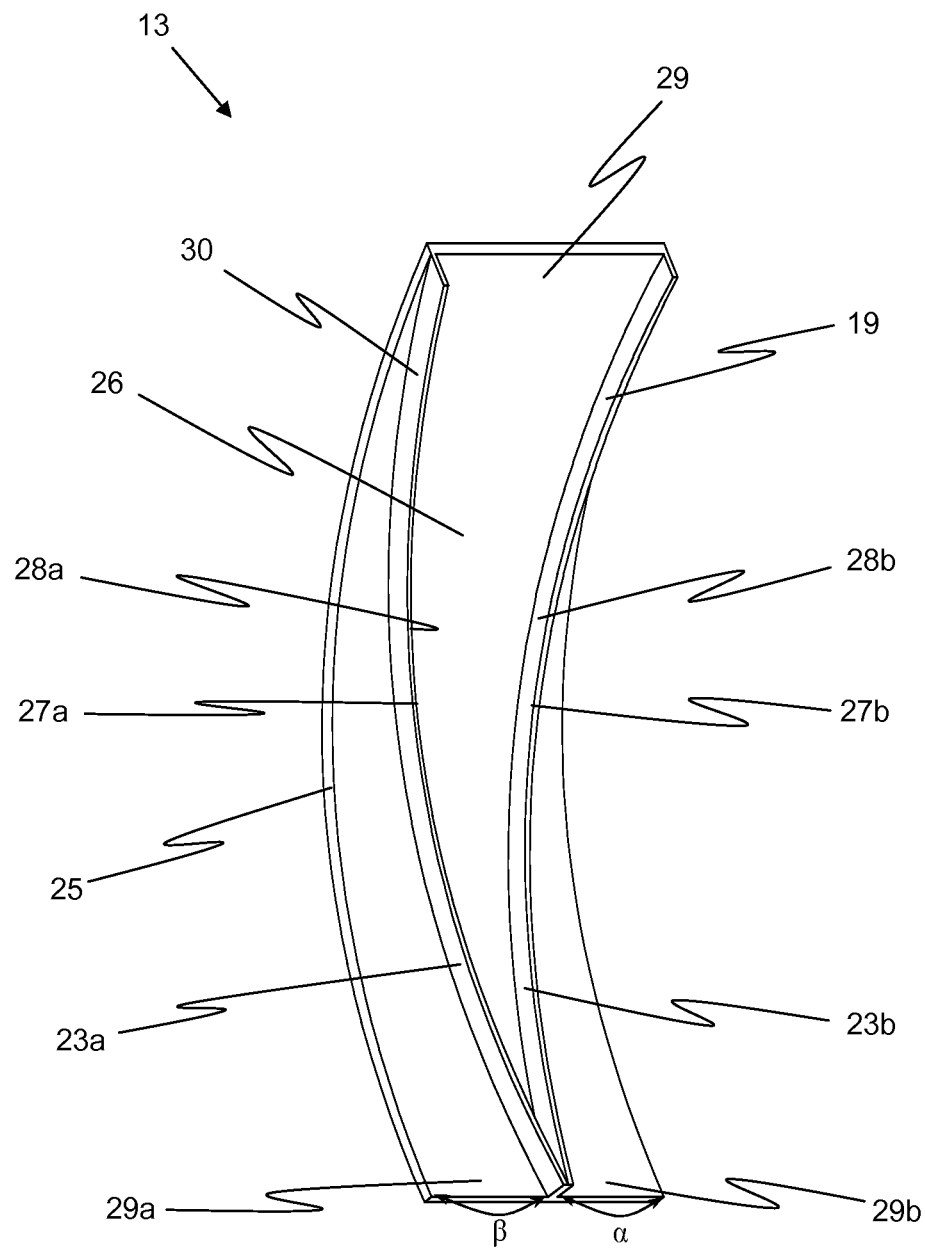
FIG. 7 is a perspective representation of another embodiment of the first cutting-to-length device with two cutting-to-length mechanism arranged towards one another in V-shape.

FIG. 7 shows another embodiment of the cutting-to-length device 13 that has a first and second cutting-to-length mechanism 19, 30. The two cutting-to-length mechanism 19, 30 are here executed as ribs 23a, 23b. Furthermore, they are arranged in such a way to one another that they form a merging V-shape in the rotational direction of the annular die 4. Consequently, the two cutting-to-length mechanism 19, 30 are arranged mirror reversed with respect to each other, in which case the first cutting-to-length mechanism 19 has a positive angle of climb α and the second cutting-to-length mechanism 30 has a negative angle of climb β. The pellets 11 not shown here reach the area of the two cutting-to-length mechanism 19, 30 by way of the joint feed opening 29.

Compared to the annular die 4, the cutting-to-length device 13 can also be arranged in such a way that the two cutting-to-length mechanism 19, 30 create a diverging V-shape. Therefore, the pellets would reach the area of the second cutting-to-length mechanism 30 through a first feed opening 29a and the area of the first cutting-to-length mechanism 19 through a second feed opening 29b.

In an embodiment not shown here, the angles of climb can also be executed in different sizes to create a tilted V-shape.

Figure 8:
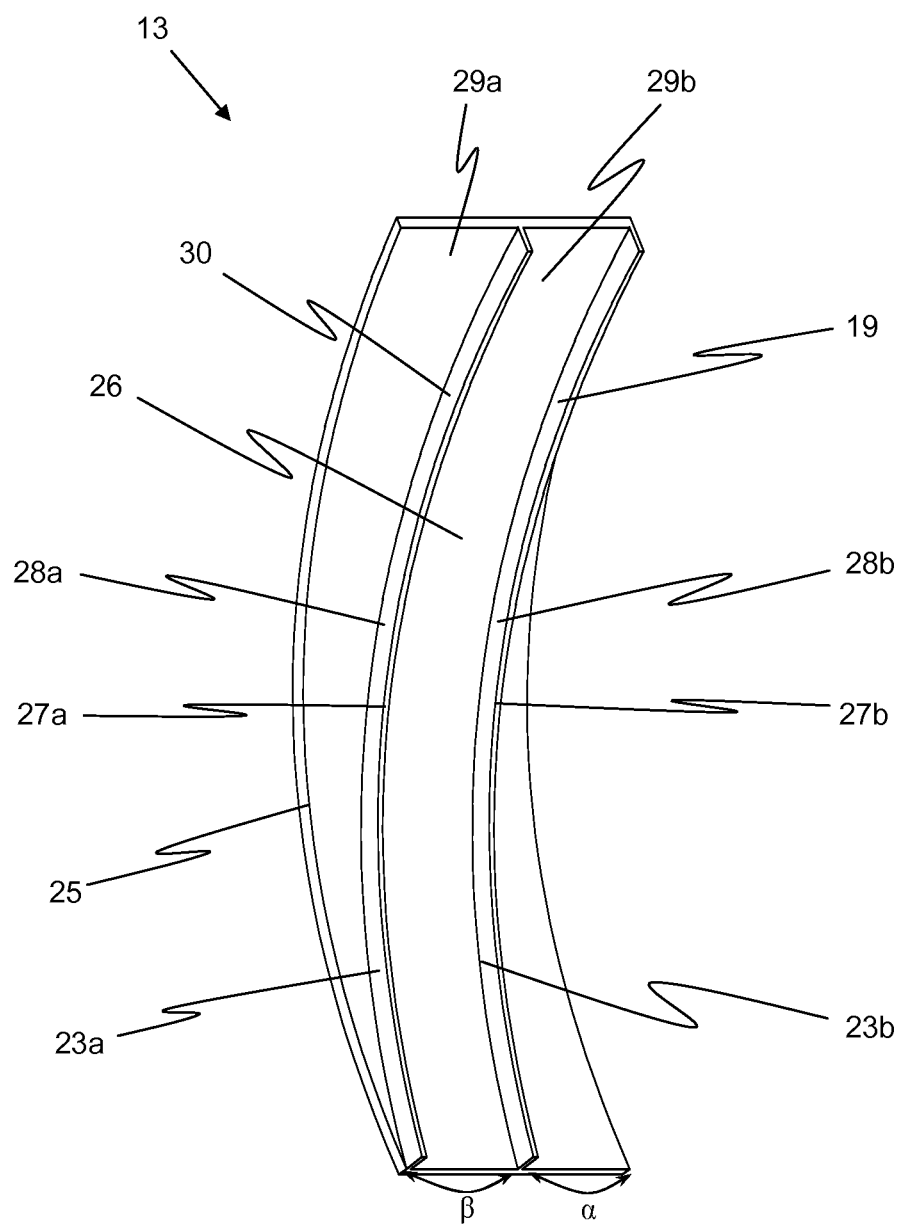
FIG. 8 is a perspective representation of another embodiment of the first cutting-to-length device with two cutting-to-length mechanism running severed from each other and parallel to one another in axial direction.

In another embodiment of the cutting-to-length device 13 shown in FIG. 8, the two cutting-to-length mechanism 19, 30 are at a constant distance from one another in the axial direction of the annular die 4. The two angles of climb α, β of the two cutting-to-length mechanism 19, 30 are consequently executed positively or negatively. The pellets 11 not shown here reach the corresponding cutting-to-length mechanism 19, 30 via the two feed openings 29a, 29b. Thus, the two cutting-to-length mechanism 19, 30 divide the pellets 11 radially protruding above the annular die 4 in the axial direction into two areas. Advantageously, the angle of climb α, β of the two cutting-to-length mechanism 19, 30 can be made flatter compared to the embodiment of the cutting-to-length device 13 shown in FIG. 2. The flat angle of climb α, β allows the pellets to be snapped off gently and a lot slower without the high accelerations that had occurred so far.

The embodiments of the cutting-to-length device 13 shown in FIGS. 2, 3, 5, 7 and 8 can alternatively also extend across the entire perimeter of the annular die 4. Therefore, the cutting-to-length device 13 would be executed as a closed circle. In addition, several cutting-to-length devices can naturally also be arranged contiguously to one another or separated from one another in the pellet press 1 in the axial direction of the annular die 4. Any combination of cutting-to-length mechanism 19 executed as grooves 22, ribs 23 and/or shoulders 24 is also conceivable. Furthermore, the respective end of the cutting-to-length device in the area of the feed opening 29, from whose side the pellets to be severed are led, is executed very thinly to prevent the pellets 11 from reaching the end of the cutting-to-length mechanism 19 and abruptly slowing down. This can additionally or alternatively be accomplished by an axial positioning of the ends outside of the area of the annular die 4.

Figure 9:
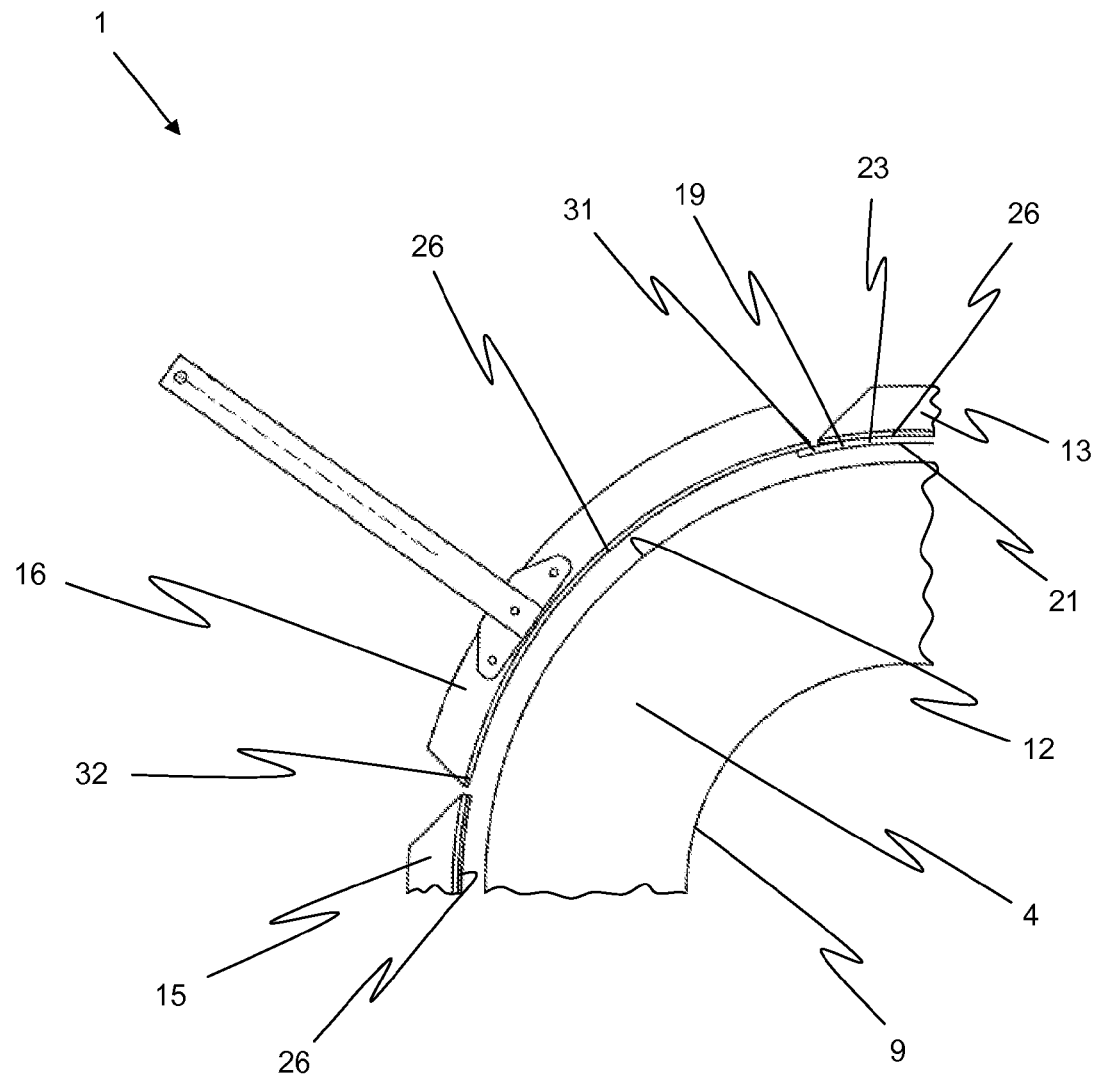
FIG. 9 is a detailed view of a pellet press in the area of a first and/or second cutting-to-length device.

FIG. 9 shows a detailed view of the pellet press 1 from FIG. 1 in the area of the fourth cutting-to-length device 16. As already mentioned in the description from FIG. 1, the cutting-to-length devices 13, 14, 15, 16 are at a preferred shorter distance of 10 mm to one another. This makes it possible to prevent them from bumping into one another during adjustment in the radial direction, thus mutually blocking one another. The disadvantage of this arrangement is that owing to manufacturing tolerances and/or an imprecise adjustment of the radial distances, pellets 11 bounce in the radial direction on a higher-positioned end of one of the cutting-to-length devices 13, 14, 15, 16, as a result of which they would be abruptly slowed down. To prevent this, at least one of the cutting-to-length devices 13, 14, 15, 16 contiguous to the radial guide surfaces 26 has an inlet area 32. In this embodiment, the inlet area 32 is arranged on the end of the radial guide surface 26 of the fourth cutting-to-length device 16 that points against the circumferential direction of the pellets 11.

Accordingly, a pellet 11 in the area of the third cutting-to-length device 15 broken in the through-hole 5 of the annular die 4 (not shown here) is pressed by the centrifugal force with its free end 20 against the radial guide surface 26 of the third cutting-to-length device 15 and guided radially by it. As soon as the pellet 11 reaches the area of the fourth cutting-to-length device 16, it can move somewhat radially outwards owing to the beveled inlet area 32. This prevents the pellet 11 from bouncing off the end of the fourth cutting-to-length device 16 and be slowed down suddenly. Afterwards, the inlet area 32 guides the pellet 11 towards the radial guide surface 26, which continues to guide the pellet 11 in the circumferential direction.

In the detailed view of FIG. 9 it can be recognized that the cutting-to-length mechanism 19 or the rib 23 of the first cutting-to-length device 13 extends in the circumferential direction in the area of the fourth cutting-to-length device 16 arranged contiguously to it. Thus, the protruding area of the cutting-to-length mechanism 19 creates a radial stop 31 for the fourth cutting-to-length device 16. Once the distance of the first cutting-to-length device 13 to the annular die 4 has been set, the fourth cutting-to-length device 16 can be moved radially so far inwards until its radial guide surface 26 bumps against the stop 31 of the first cutting-to-length device 13. In that case, the radial guide surfaces 26 of the two cutting-to-length devices 13, 16 are largely at the same distance from the annular die 4.

Figure 10:
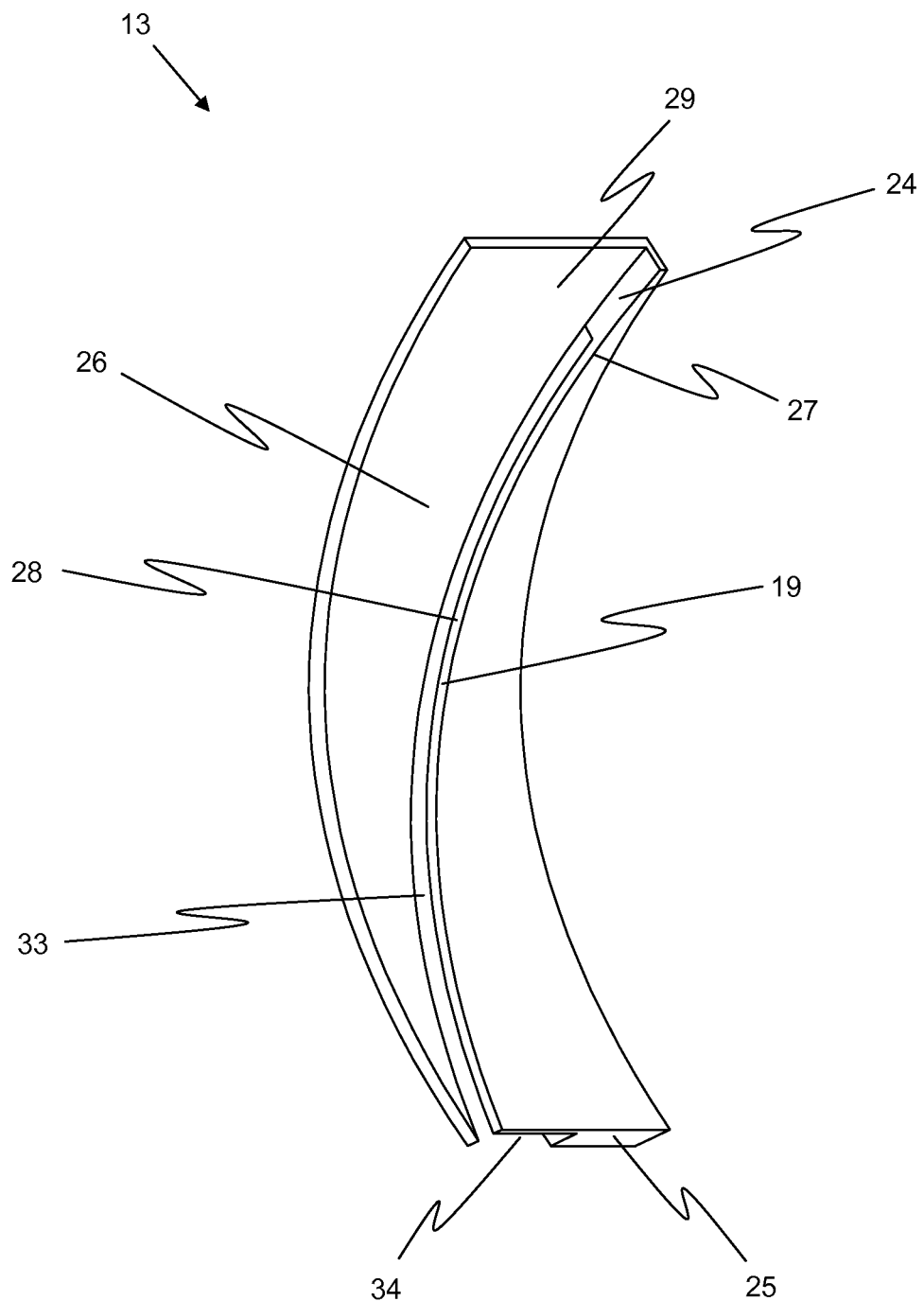
FIG. 10 is a perspective representation of an alternative embodiment of a first cutting-to-length device with outlet opening, outlet duct and a cutting-to-length mechanism executed as shoulder.

The embodiment shown in FIG. 10 is essentially identical to the one shown in FIG. 3, although the cutting-to-length mechanism 19 has been executed as a shoulder 24. Additionally, however, the cutting-to-length device 13 has an outlet opening 33. An outlet duct 34 is connected to this outlet opening 33, thereby preventing that the pellets 11 protruding from the through-holes 5 of the annular die 4 are struck off in an undefined length from already severed pellets 11 that are flying around in the area between the external perimeter of the annular die 4 and the radial guide surface 26

Here, the outlet opening 33 is executed in such a way and/or arranged in such a way in the area of the radial guide surface 26 and/or of the cutting-to-length mechanism 19 that the severed pellets 11 can be radially led outward by the centrifugal force from the inner side of the cutting-to-length device 13 facing the annular die 4, especially through the basic body 25. After the snapped off pellets have emerged out of the annular gap through at least one outlet opening 33, i.e. out of the area between annular die 4 and cutting-to-length device 13, they are guided by means of at least one outlet duct 34 to the ejection area of the pellet press not shown here.

The outlet opening 33 is arranged directly adjacent to and/or located radially outside the cutting-to-length mechanism 19. According to FIG. 10, the outlet opening 33 is executed in the contact surface 28 portion of the shoulder 24.

Figure 11:
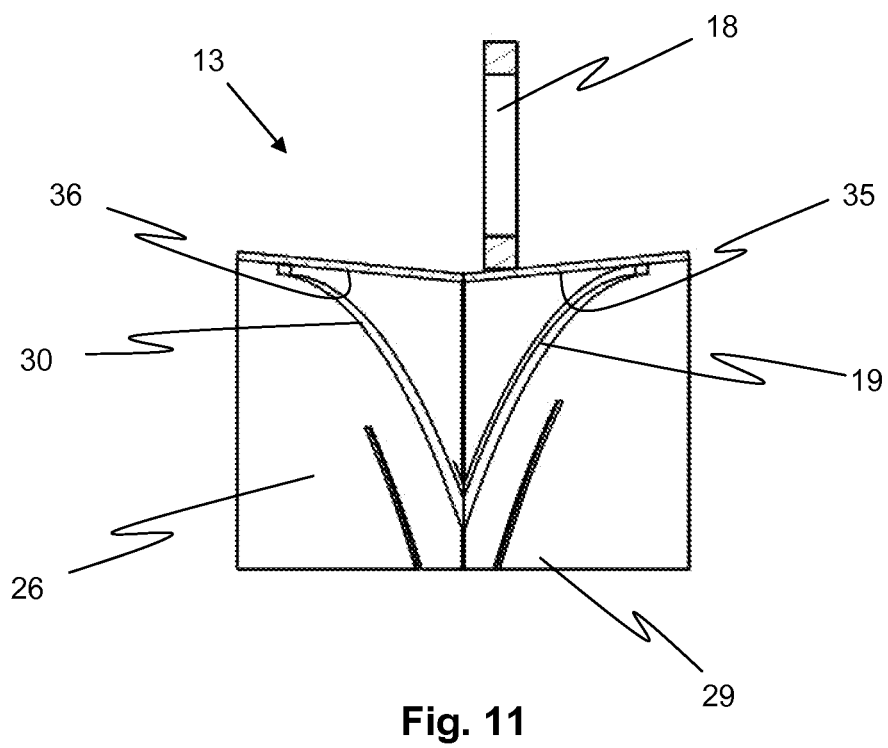
FIG. 11 is an alternative embodiment of the first cutting-to-length device in cross section with a cutting-to-length mechanism executed as rib and a radial guide surface shaped like a gabled roof.

FIG. 11 shows an alternative embodiment of the first cutting-to-length device 13 in cross section. The significant difference to the previous embodiments consists in that the radial guide surface 26 has a first 35 and a second bevel 36, which give the radial guide surface 26 a gabled form in cross section. Advantageously, severed pellets 11 can be led very quickly out of the area of the cutting-to-length mechanism 19, 30.

FIG. 12 shows a second cutting-to-length device 14 that can be preferably mounted in the circumferential direction of the annular die 4 in the area of a Koller roller 7, 8 (cf. FIG. 1), with a radial guide surface 26 executed as a cutting-to-length mechanism 19. Furthermore, the second cutting-to-length device 14 comprises a fastening area (not visible because the inner side is shown), in which the second cutting-to-length device 14 can be fastened in such a way to a stationary housing part of the pellet press 1 that the cutting-to-length guide surface 26 executed for this can be arranged in the radially outer area of the pivoted annular die 4 of the pellet press 1 and spaced apart from it. The cutting-to-length device 14 has a basic body 25 that has the radial guide surface 26 bent in a concave way on its inner side and that acts as a cutting-to-length means 19. To do this, the radial guide surface 26 can be mounted by means of the fastening area 17 in the radially outer area of the annular die 4 at such distance that a pellet 11 protruding above the annular die 4 in its radial direction and/or in the area of a Koller roller 7, 8 of the pellet press 1, is pressed radially outward, especially against the radial guide surface 26, in the area of its free end, and comes to rest, especially with its front side, on the radial guide surface 26. The pellet 11 is capable of moving in the circumferential direction along this radial guide surface 26 executed as a cutting-to-length mechanism 19 in such a way that the pellet 11 is deflected by the radial guide surface 26 by means of a friction force acting on it in largely the circumferential direction of the annular die 4 until it snaps off in the area of the annular die 4. Thus, the pellet 11 is not slowed down abruptly, but led in the circumferential direction along the path of a defined angular area of the annular die, on its front side facing the cutting-to-length mechanism 19 and pointing in radially. In this case, the pellet 11 is deflected more and more from its original radial starting position in the circumferential direction of the annular die 4 until the pellet 11 snaps off gently in the area of the annular die 4. This prevents an undefined breaking or cutting to length of the pellets 11 into pellet pieces having different lengths.

FIG. 13 shows a cross-sectional view of an alternative embodiment of the second cutting-to-length device 14. The essential difference to the previous embodiment consists in that the radial guide surface 26 has a first 35 and second bevel 36. As a result of this, the radial guide surface 26 has a gabled design in cross section. This advantageous design allows the very fast ejection of severed pellets 11.

It is naturally likewise conceivable for the previously described alternative cutting-to-length devices to also have such an outlet opening 33 and/or corresponding outlet duct 34.

This invention is not restricted to the embodiments shown and described. Variations within the framework of the patent claims are just as possible as a combination of characteristics, even if these are shown and described in different embodiments.

The invention claimed is:

1. A cutting device for cutting biogenic fibrous pellets to length in a pellet press having a stationary housing and a rotating annular die with a plurality of through holes defined therein through which pellets are pressed, the cutting device comprising:
   a fastening area that attaches the cutting device to the stationary housing of the pellet press;
   a cutting-to-length mechanism disposed radially around and spaced from the rotating annular die of the pellet press;
   the cutting-to-length mechanism comprising a basic body that defines a concave curvilinear guide surface spaced at a radial distance from and disposed radially opposite to the annular die and an additional structure provided on the curvilinear guide surface as a contact surface extending helically in an axial direction and radially inward or outward relative to the guide surface; and
   wherein the cutting-to-length mechanism is radially spaced and oriented relative to the annular die such that the pellets that extend radially out of the through holes in the annular die have outer ends that engage against the contact surface of the additional structure provided on the curvilinear guide surface as the annular die rotates and the pellets continue to be pressed out through the holes in the annular die, wherein a force is generated by such engagement and continued rotational movement of the annular die relative to the curvilinear guide surface that causes a base of the pellets to snap off at the annular die.

2. The cutting device as in claim 1, wherein the radial distance between the guide surface and the annular die is constant.

3. The cutting device as in claim 1, wherein the contact surface extends radially inward relative to the guide surface and is oriented such that sides of the pellets at their outer ends engage against the contact surface as the annular die rotates, thereby generating the force that causes the pellets to snap off at the annular die.

4. The cutting device as in claim 1, wherein the helically extending contact surface is defined by a shoulder or rib formed on the guide surface.

5. The cutting device as in claim 4, wherein the contact surface is delimited by an edge on the shoulder or rib.

6. The cutting device as in claim 1, wherein the contact surface of the additional structure of the cutting-to-length mechanism further comprises a helical groove defined in the guide surface, wherein the outer ends of the pellets extend into the groove and engage against a side of the groove as the annular die rotates, thereby generating the force that causes the pellets to snap off at the annular die.

7. The cutting device as in claim 1, wherein the additional structure of the cutting-to-length mechanism further comprises a first contact surface extending radially inward from the guide surface, and a second contact surface extending radially inward from the guide surface and spaced axially from the first contact surface, wherein sides of the outer ends of the pellets engage against one or the other of the first and second contact surfaces as the annular die rotates, thereby generating the force that causes the base of the pellets to snap off at the annular die.

8. The cutting device as in claim 7, wherein the first and second contact surfaces extend helically in an axial direction along the guide surface.

9. The cutting device as in claim 1, wherein the basic body comprises an outlet opening, wherein snapped-off pellets are guided by centrifugal force along the guide surface to the outlet opening.

10. The cutting device as in claim 9, wherein the the outlet opening is defined adjacent to the contact surface of the additional structure.

11. The cutting device as in claim 10, wherein the outlet opening is oriented transversely to the guide surface.

12. The cutting device as in claim 1, wherein the radial distance between the guide surface and the annular die decreases along a rotational direction of the annular die.

13. A pellet press for pressing biogenic fibrous pellets, comprising:
 a stationary housing;
 a rotating annular die with a plurality of through holes defined therein through which the pellets are pressed;
 a cutting device for cutting the pellets to length, the cutting device further comprising
  a fastening area that attaches the cutting device to the stationary housing of the pellet press;
  a cutting-to-length mechanism disposed radially around and spaced from the rotating annular die of the pellet press;
  the cutting-to-length mechanism comprising a basic body that defines a concave curvilinear guide surface spaced at a radial distance from and disposed radially opposite to the annular die and an additional structure provided on the curvilinear guide surface as a contact surface extending helically in an axial direction and radially inward or outward relative to the guide surface along an area of the annular die having the through holes defined therein; and
 wherein the cutting-to-length mechanism is radially spaced and oriented relative to the annular die such that the pellets that extend radially out of the through holes in the annular die have outer ends that engage against the contact surface of the additional structure provided on the curvilinear guide surface as the annular die rotates and the pellets continue to be pressed out through the through holes in the annular die, wherein a force is generated by such engagement and continued rotational movement of the annular die relative to the guide surface that causes a base of the pellets to snap off at the annular die.

14. The pellet press as in claim 13, further comprising a pair of Koller rollers operationally configured within the annular die, the cutting-to-length mechanism disposed circumferentially between the Koller rollers.

15. The pellet press as in claim 14, further comprising a second cutting-to-length-mechanism disposed circumferentially aligned with one of the Koller rollers, wherein the cutting-to-length mechanisms define a closed ring configuration around the annular die.

* * * * *